United States Patent
Deenoo et al.

(10) Patent No.: US 12,035,187 B2
(45) Date of Patent: Jul. 9, 2024

(54) DELAYED HANDOVER EXECUTION IN WIRELESS NETWORKS BASED ON A TRIGGER CONDITION

(71) Applicant: INTERDIGITAL PATENT HOLDINGS, INC., Wilmington, DE (US)

(72) Inventors: Yugeswar Deenoo, Chalfont, PA (US); Ghyslain Pelletier, Montréal (CA); Mouna Hajir, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/495,239

(22) PCT Filed: Mar. 22, 2018

(86) PCT No.: PCT/US2018/023764
§ 371 (c)(1),
(2) Date: Sep. 18, 2019

(87) PCT Pub. No.: WO2018/175721
PCT Pub. Date: Sep. 27, 2018

(65) Prior Publication Data
US 2020/0154326 A1    May 14, 2020

Related U.S. Application Data

(60) Provisional application No. 62/564,191, filed on Sep. 27, 2017, provisional application No. 62/519,662, (Continued)

(51) Int. Cl.
*H04W 36/00* (2009.01)
*H04W 24/08* (2009.01)
(Continued)

(52) U.S. Cl.
CPC ..... *H04W 36/00837* (2018.08); *H04W 24/08* (2013.01); *H04W 24/10* (2013.01);
(Continued)

(58) Field of Classification Search
CPC ....... H04W 36/0077; H04W 36/00837; H04W 36/30
See application file for complete search history.

(56) References Cited

U.S. PATENT DOCUMENTS 9,226,208 B2   12/2015  Alam et al.
9,237,494 B2    1/2016  Sashihara et al.
(Continued)

FOREIGN PATENT DOCUMENTS

CN  104581849 A   4/2015
CN  106060870 A  10/2016
(Continued)

OTHER PUBLICATIONS

R2-1700864 Ericsson "Conditional Handover" 3GPP TSG-RAN WG2 #Jan. 13-17, 97, 2017 Athens, Greece. (Year: 2017).*
(Continued)

*Primary Examiner* — Basil Ma
(74) *Attorney, Agent, or Firm* — VOLPE KOENIG

(57) ABSTRACT

A wireless transmit/receive unit (WTRU) may receive, from a serving cell based on the measurement report, a conditional reconfiguration message that includes a trigger condition and configuration information for handover to a target cell based on the trigger condition. The conditional reconfiguration message may be stored and the WTRU monitors trigger quantities of the serving cell and the target cell for the trigger condition being met. When the trigger condition is met within a validity period, then the WTRU applies the received configuration information and starts the handover to the target cell.

19 Claims, 11 Drawing Sheets

Related U.S. Application Data filed on Jun. 14, 2017, provisional application No. 62/500,981, filed on May 3, 2017, provisional application No. 62/474,948, filed on Mar. 22, 2017.

(51) Int. Cl.
*H04W 24/10* (2009.01)
*H04W 36/08* (2009.01)
*H04W 36/30* (2009.01)
*H04W 74/02* (2009.01)
*H04W 74/0833* (2024.01)

(52) U.S. Cl.
CPC ......... *H04W 36/08* (2013.01); *H04W 36/305* (2018.08); *H04W 74/02* (2013.01); *H04W 74/0833* (2013.01)

(56) References Cited

U.S. PATENT DOCUMENTS

| | | | |
|---|---|---|---|
| 9,521,565 | B2 | 12/2016 | Tenny et al. |
| 10,015,705 | B2 | 7/2018 | Xu et al. |
| 10,764,870 | B2 | 9/2020 | Yi et al. |
| 2009/0075666 | A1 | 3/2009 | Makhijani et al. |
| 2009/0129296 | A1 | 5/2009 | Grinshpun et al. |
| 2010/0124203 | A1 | 5/2010 | Tenny et al. |
| 2010/0184438 | A1 | 7/2010 | Wu |
| 2014/0126545 | A1 | 5/2014 | Tamura et al. |
| 2015/0092746 | A1* | 4/2015 | Jang ................ H04W 36/0094 370/331 |
| 2016/0174124 | A1 | 6/2016 | Basu Mallick et al. |
| 2016/0262066 | A1 | 9/2016 | Ozturk et al. |
| 2016/0277987 | A1 | 9/2016 | Chen et al. |
| 2017/0078914 | A1 | 3/2017 | Fujishiro et al. |
| 2017/0215117 | A1* | 7/2017 | Kwon ................ H04W 36/32 |
| 2018/0279193 | A1* | 9/2018 | Park ................ H04W 36/08 |
| 2019/0246323 | A1* | 8/2019 | Kim ................ H04W 36/305 |
| 2019/0357093 | A1* | 11/2019 | Xu ................ H04W 36/0044 |
| 2019/0387440 | A1* | 12/2019 | Yiu ................ H04W 36/0072 |
| 2020/0107235 | A1* | 4/2020 | Peisa ................ H04W 24/08 |

FOREIGN PATENT DOCUMENTS

| | | |
|---|---|---|
| EP | 3 174 329 | 5/2017 |
| WO | 2008/120159 A2 | 10/2008 |
| WO | 2013114203 A2 | 8/2013 |
| WO | 2015/168895 | 11/2015 |
| WO | 2016/140757 A1 | 9/2016 |

OTHER PUBLICATIONS

R1-1700034 Huawei "RACH preamble design for NR" 3GPP WG1 NR ad Hoc Spokane Jan. 16-20, 2017 (Year: 2017).*
Ericsson, "Conditional Handover," 3GPP TSG-RAN WG2 #97bis, Tdoc R2-1702675, Spokane, USA (Apr. 3-7, 2017).
Ericsson, "Conditional Handover," 3GPP TSG-RAN WG2 #97Tdoc R2-1700864, Athens, Greece (Jan. 13-17, 2017).
European Telecommunications Standards Institute, LTE; Evolved Universal Terrestrial Radio Access (E-UTRA); Radio Resource Control (RRC); Protocol specification (3GPP TS 36.331 version 11.12.0 (Release 11), ETSI TS 136 331 V11.12.0 (Jul. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
Interdigital Communications, "Conditional Reconfiguration for NR," 3GPP TSG-RAN WG2 Ad Hoc, R2-1706690, Qingdao, China (Jun. 27-29, 2017).
Lenovo et al., "Conditional handover in NR," 3GPP TSG-RAN WG2 Meeting#97bis, R2-1702794, Spokane, USA (Apr. 3-7, 2017).
Ortigoza, "Handover Parameters (Part 1 of 3)," Expert Opinion (Feb. 22, 2012).
Samsung, "Introduction of UE autonomous handover," 3GPP TSG-RAN WG2 2017 RAN2#97bis Meeting, R2-1703287, Spokane, USA (Apr. 3-7, 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.2.0 (Mar. 2017).
Third Generation Partnership Project, "Technical Specification Group Radio Access Network; Evolved Universal Terrestrial Radio Access (E-UTRA); Radio Resource Control (RRC);Protocol specification (Release 13)," 3GPP TS 36.331 V13.1.0 (Mar. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.1.0 (Dec. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.5.0 (Dec. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0 (Dec. 2017).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 14)," 3GPP TS 36.213 V14.5.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.5.0 (Dec. 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.5.1 (Jan. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018).
Intel Corporation, "NW controlled autonomous handover in single connectivity," 3GPP TSG RAN WG2 Meeting #97, R2-1701711, Athens, Greece (Feb. 13-17, 2017).
Third Generation Partnership Project, "Technical Specification Group Radio Access Network; Study on new radio access technology: Radio access architecture and interfaces (Release 14)," 3GPP TR 38.801 V14.0.0 (Mar. 2017).
Third Generation Partnership Project, "Technical Specification Group Radio Access Network; Study on New Radio Access Technology; Radio Access Architecture and Interfaces (Release 14)," 3GPP TR 38.801 V2.0.0 (Mar. 2017).
Zte, "Discussion on single connected handover," 3GPP TSG-RAN WG2 Meeting #99, R2-1708120, Berlin, Germany (Aug. 21-25, 2017).
AT&T, "Intra-frequency DC to enable mobility with close to zero ms interruption," 3GPP TSG-RAN WG2 #99, R2-1708204, Berlin, Germany (Aug. 21-25, 2017).
China Telecom et al., "Rel-15 Further Mobility Enhancement for Eutran," 3GPP TSG RAN Meeting #75, RP-170264, Dubrovnik, Croatia (Mar. 6-9, 2017).
Ericsson, "0 ms interruption support during handover procedure in NR," 3GPP TSG-RAN WG2 #99, R2-1708028, Berlin, Germany (Aug. 21-25, 2017).
Huawei et al., "DC based NR scheme for 0ms interruption handover," 3GPP TSG-RAN WG2 #99, R2-1708877 (Aug. 21-25, 2017).
U.S. Appl. No. 62/442,887, Byun et al., Data Forwarding Procedure for NR (Jan. 5, 2017).

* cited by examiner

DELAYED HANDOVER EXECUTION IN WIRELESS NETWORKS BASED ON A TRIGGER CONDITION

This application is the U.S. National Stage, under 35 U.S.C. § 371, of International Application No. PCT/US2018/023764 filed Mar. 22, 2018, which claims the benefit of U.S. Provisional Application Ser. No. 62/474,948 filed Mar. 22, 2017, U.S. Provisional Application Ser. No. 62/500,981 filed May 3, 2017, U.S. Provisional Application Ser. No. 62/519,662 filed Jun. 14, 2017, and U.S. Provisional Application Ser. No. 62/564,191 filed Sep. 27, 2017, the contents of which are hereby incorporated by reference herein.

BACKGROUND

Fifth generation (5G) wireless systems and networks may utilize new frames, multiplexing, and mobility procedures to provide enhanced mobile broadband (eMBB), ultra-reliable low latency communication (URLLC), massive Machine Type Communication (mMTC), etc. for a new radio (NR) access technology. Mobility, handover, handoff, or a cell change is needed at the proper time or event to prevent handover failure or radio link failure. Reliable or flexible mobility is desirable for downlink and uplink URLLC traffic or 5G traffic that may be sporadic, infrequent, bursty, use small payloads, unscheduled, or unpredictable.

SUMMARY

A wireless transmit/receive unit (WTRU), user equipment (WTRU), or network may utilize a reconfiguration message including one or more trigger conditions. The WTRU may store and apply the reconfiguration message with delay based on the one or more trigger conditions. Upon monitoring a trigger condition and determining whether the trigger condition is met, a function or command specified in the reconfiguration message may be performed by the WTRU. A time period between detection of an impairment event and performance of a corrective action may also be shortened for a handover, handoff, cell change, cell switch, or the like.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
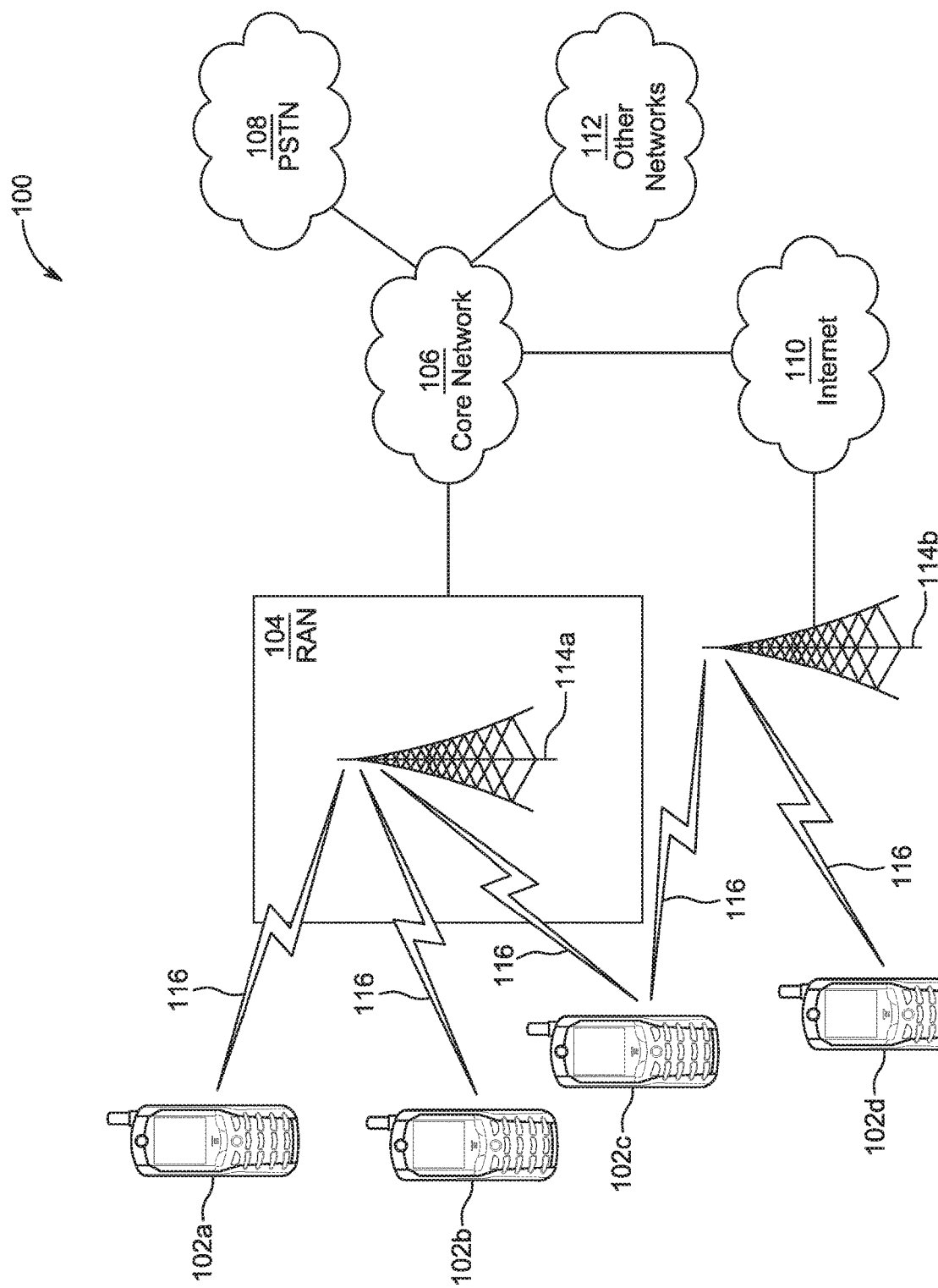
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a next generation node-b (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or communications sent to/from multiple types of base stations (e.g., an eNB and a gNB).

In other embodiments, the base station 114a and the WTRUs 102a, 102b, 102c may implement radio technologies such as Institute of Electrical and Electronics Engineers (IEEE) 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the communication control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
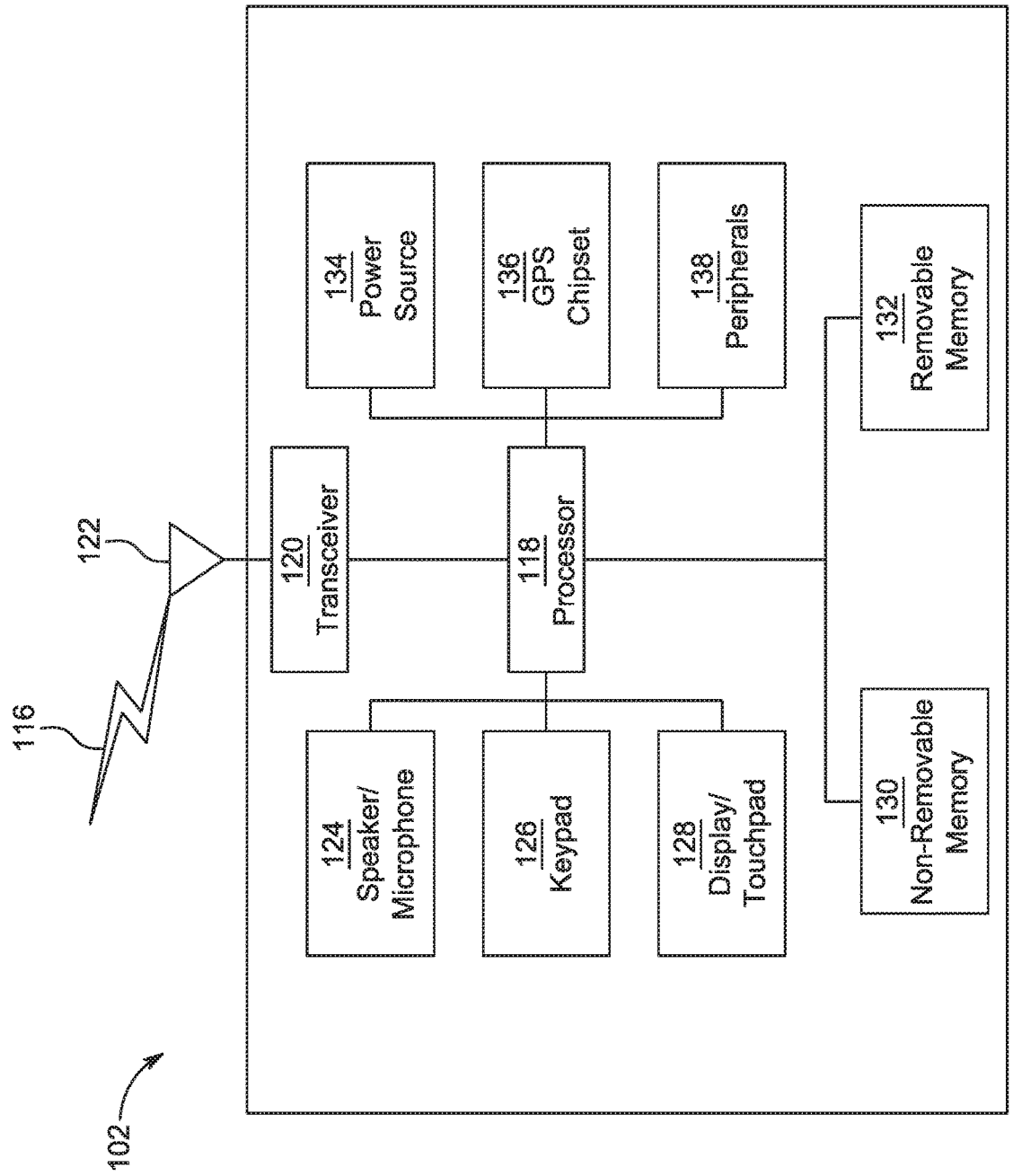
FIG. 1B is a system diagram of an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, a humidity sensor, or the like.

The WTRU 102 may include a full duplex radio for which communication and reception of some or all of the signals (e.g., associated with particular subframes for both the UL (e.g., for communication) and DL (e.g., for reception) may be substantially concurrent, synchronized, simultaneous, or the like. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which communication and reception of some or all of the signals (e.g., associated with particular subframes for either the UL (e.g., for communication) or the downlink (e.g., for reception)).

Figure 1C:
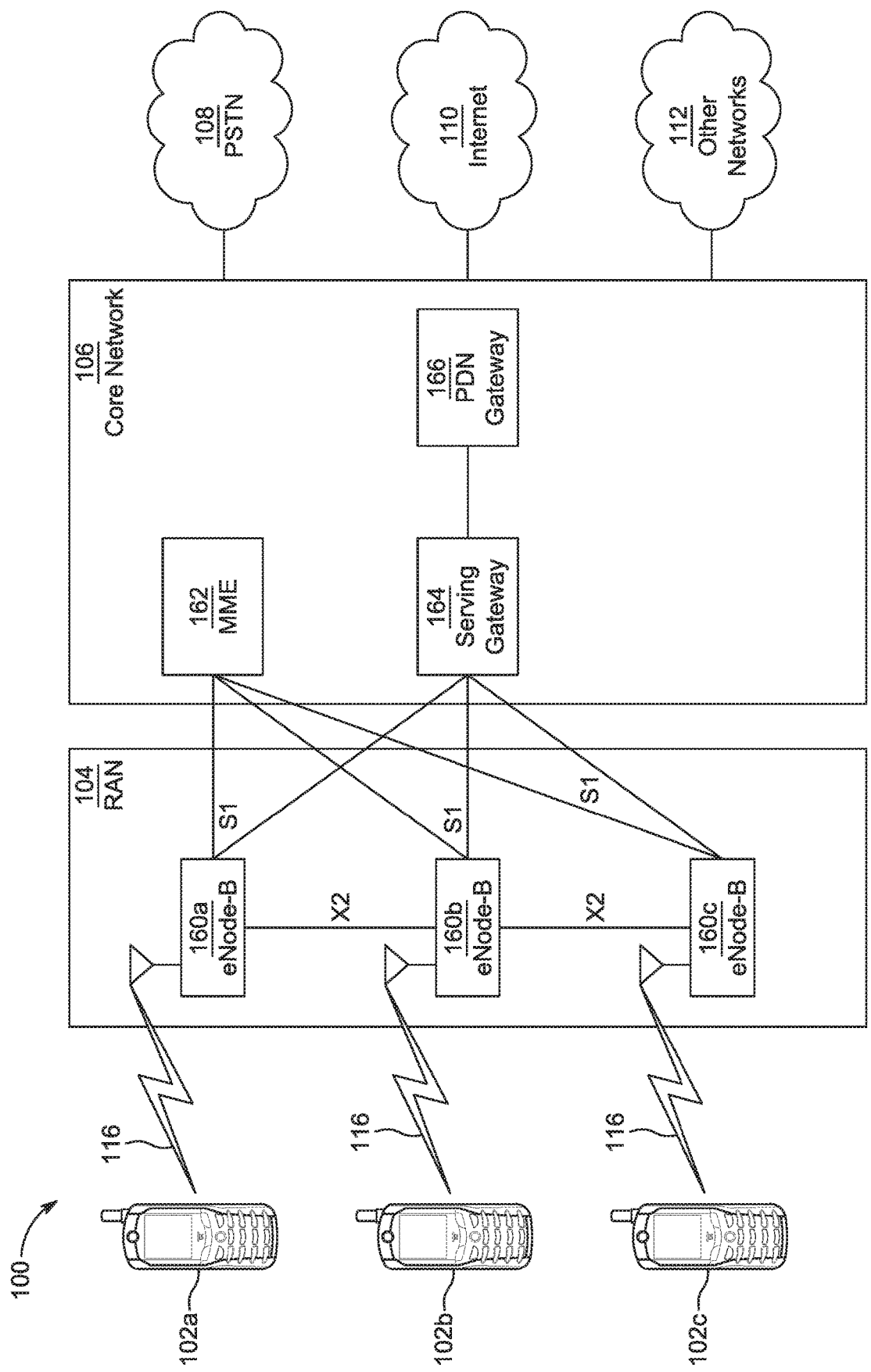
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more STAs associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width, set via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
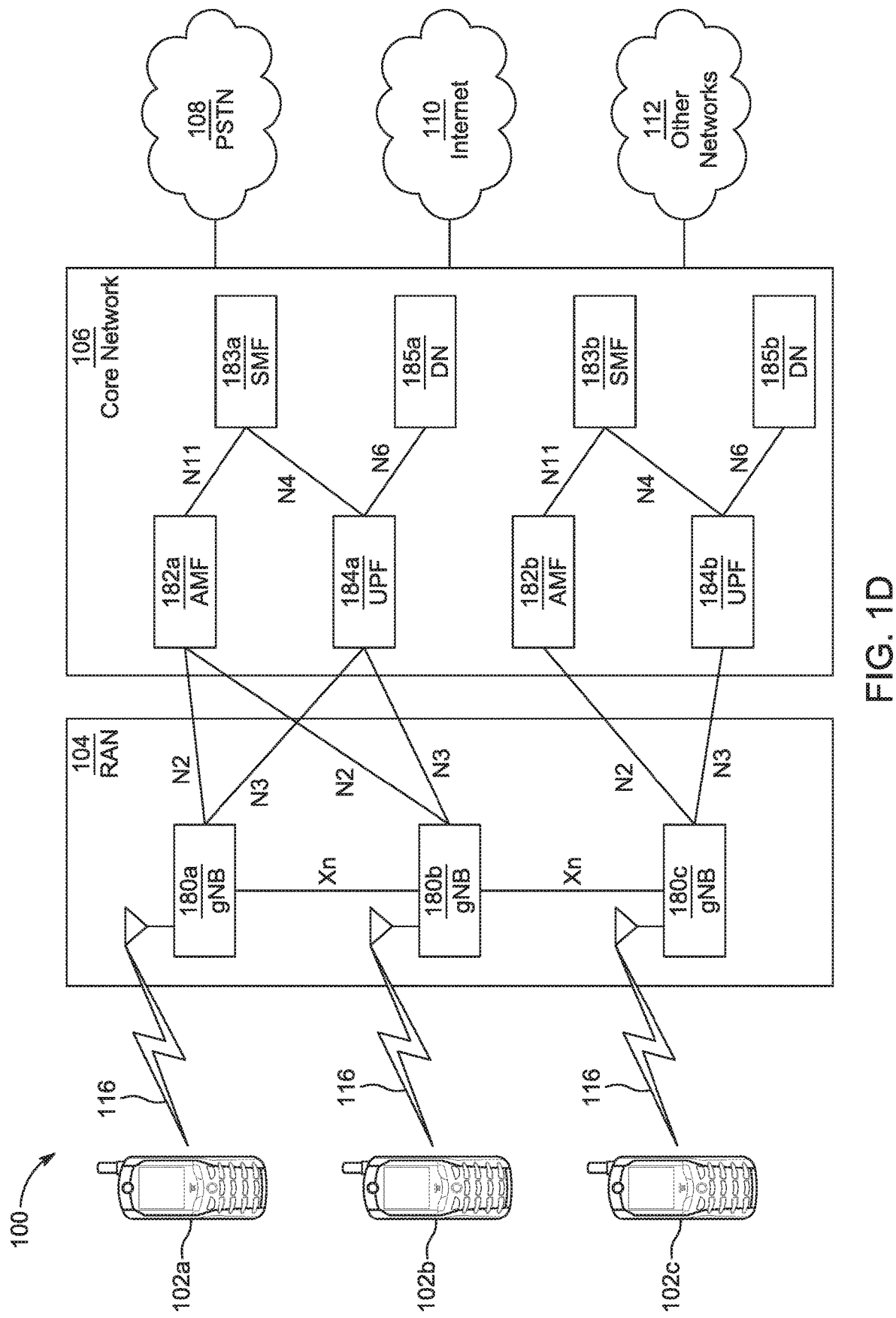
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Also, in an example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated communications from gNB 180a and gNB 180b (and/or gNB 180c).

The WTRUs 102a, 102b, 102c may communicate with gNBs 180a, 180b, 180c using communications associated with a scalable numerology. For example, the OFDM symbol spacing and/or OFDM subcarrier spacing (SCS) may vary for different communications, different cells, and/or different portions of the wireless communication spectrum. The WTRUs 102a, 102b, 102c may communicate with gNBs 180a, 180b, 180c using subframe or communication time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced massive mobile broadband (eMBB) access, services for MTC access, and/or the like. The AMF 182a, 182b may provide a control plane function for switching between the RAN 104 and other RANs (not shown) that employ other radio technologies, such as LTE, LTE-A, LTE-A Pro, and/or non-Third Generation Partnership Project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the examples given herein, a WTRU may delete, release, overwrite, or the like a first conditional reconfiguration upon receiving a second conditional reconfiguration from a network element. The first conditional reconfiguration may be stored by the WTRU for a certain or extended time period instead of immediately applied and discarded. One, more, or multiple contention free random access (CFRA) resources for one or more target cells may be utilized in relation to a conditional reconfiguration. Random access resources may comprise random access preambles, time and/or frequency resources. In addition, the WTRU may be configured with a mapping between physical cell identification (ID) and CFRA resource. Each CFRA resource may be associated with a DL beam or group of DL beams associated with one or more target cells. A cell may comprise a mobile network area, coverage area, hotspot, represent a sector, a small cell, femtocell, picocell, or the like.

Improved broadband (IBB), industrial control and communications (ICC) and vehicular applications (V2X), massive machine-type communications (mMTC), MTC operation including narrowband operation, ultra-low transmission latency (LLC), ultra-reliable transmission (URC), ultra-reliable low latency services (URLLC), or high data rate mobile broadband services (eMBB) configurations for 5G may be configured to utilize conditional reconfigurations to reduce latency, have very high reliability, reduce overhead, or the like. Support for LLC may include supporting an air interface with a latency as low as 1 milliseconds (ms) or less for a round trip time (RTT) and may require support for TTIs between 100 µs and 250 µs. ICC and V2X may require end-to-end (e2e) latency of less than 10 ms. Another consideration may be support for mobility for speed of 0-500 km/h and a packet loss ratio of less than $10e^{-6}$.

Support for an air interface for narrowband operation, extended battery life, and minimal communication overhead for small and infrequent data transmissions may be desirable. Small and infrequent data transmissions may have a low data rate in the range of 1-100 kbps with an access latency of seconds to hours. OFDM may be utilized for such interfaces for data transmissions in LTE, IEEE 802.11, and other network access technologies. OFDM divides the spectrum into multiple parallel orthogonal sub-bands. Each subcarrier may be shaped using a rectangular window in the time domain leading to sinc-shaped subcarriers in the frequency domain. OFDM thus requires frequency synchronization and rigorous management of uplink timing alignment within the duration of the cyclic prefix (CP) to maintain orthogonality between signals and to minimize inter-carrier interference. CP-OFDM shortcomings may be addressed by RF requirements especially when utilizing a large amount of contiguous spectrum without carrier aggregation.

The 5gFLEX radio access may utilize waveforms other than CP-OFDM to achieve spectrum flexibility that allows deployment in different frequency bands with different characteristics, including different duplex arrangements, different or variable sizes of the available spectrum including contiguous and non-contiguous spectrum allocations in the same or different bands, or the like. 5gFLEX may also support variable timing including support for multiple TTI lengths and support for asynchronous transmissions.

In 5G, both TDD and FDD duplexing schemes may be supported. For FDD operation, supplemental downlink operation may be supported using spectrum aggregation. FDD operation may support both full-duplex FDD and half-duplex FDD operation. For TDD operation, the DL/UL allocation may be dynamic where the length of a DL or a UL transmission interval may be set per transmission opportunity. Beamforming may be required in order to compensate increased pathloss at high, very high, or ultra-high frequencies. A large number of antenna elements may be utilized to achieve higher beamforming gain.

5G systems also may utilize analog, hybrid, or mixed beamforming to reduce implementation cost, such as reduce the number of RF chains needed. Analog/hybrid beams may be multiplexed in time and be applied for synchronization, physical broadcast channel (PBCH), control channels, or the like to provide cell wide coverage. For communications described herein, beam sweeping, transmission/reception of beamformed channels multiplexed in time, frequency, or space may be configured and utilized.

In the examples given herein, a reference signal may be any signal, preamble, or system signature that may be received or transmitted by a WTRU. Different reference signals may be defined for beam management in the DL and UL. For example, downlink beam management may use a channel state information-reference signal (CSI-RS), a demodulation reference signal (DMRS), a synchronization signal, or the like. Uplink beam management may use a sounding reference signal (SRS), DMRS, random access channel (RACH), or the like. A configuration may include configurations related to reference signals, for example, a sequence, time resources, or frequency resources to monitor for the reference signals, periodicity or the like. A reference signal may be measured to determine the received power of the reference signal or signal quality associated with the reference signal. The measurement results may be filtered over a predefined time period and the filtering parameters may be configured by the network.

A failure in a network may occur when the quality of a serving cell drops rapidly within a short period of time. For this event, the WTRU may not have time to report the measurement and receive the handover, handoff, or cell change command or message successfully. Handover failure may occur due to the loss of the handover, handoff, or cell change command or message. In case of high, very high, or ultra-high frequencies, failures may be magnified as the WTRU may lose the beamformed link such as due to WTRU rotation or change in the environment such as an obstruction, blockage, change of speed, or the like.

To reduce failures, upon receiving a reconfiguration message implicitly or explicitly associated with one or more conditions, a WTRU may verify and store the reconfiguration. The WTRU may start to monitor one or more conditions, detect or determine a trigger condition, and apply the reconfiguration when the trigger condition is satisfied. For example, the WTRU may receive a RRC connection reconfiguration with a mobility information element (IE) or with one or more conditional mobility IEs per candidate target cell. A configuration or reconfiguration message may include parameters associated with the trigger condition such as a counter(s), timer(s), offset(s), threshold(s), filtering coefficient(s), or the like.

Figure 2:
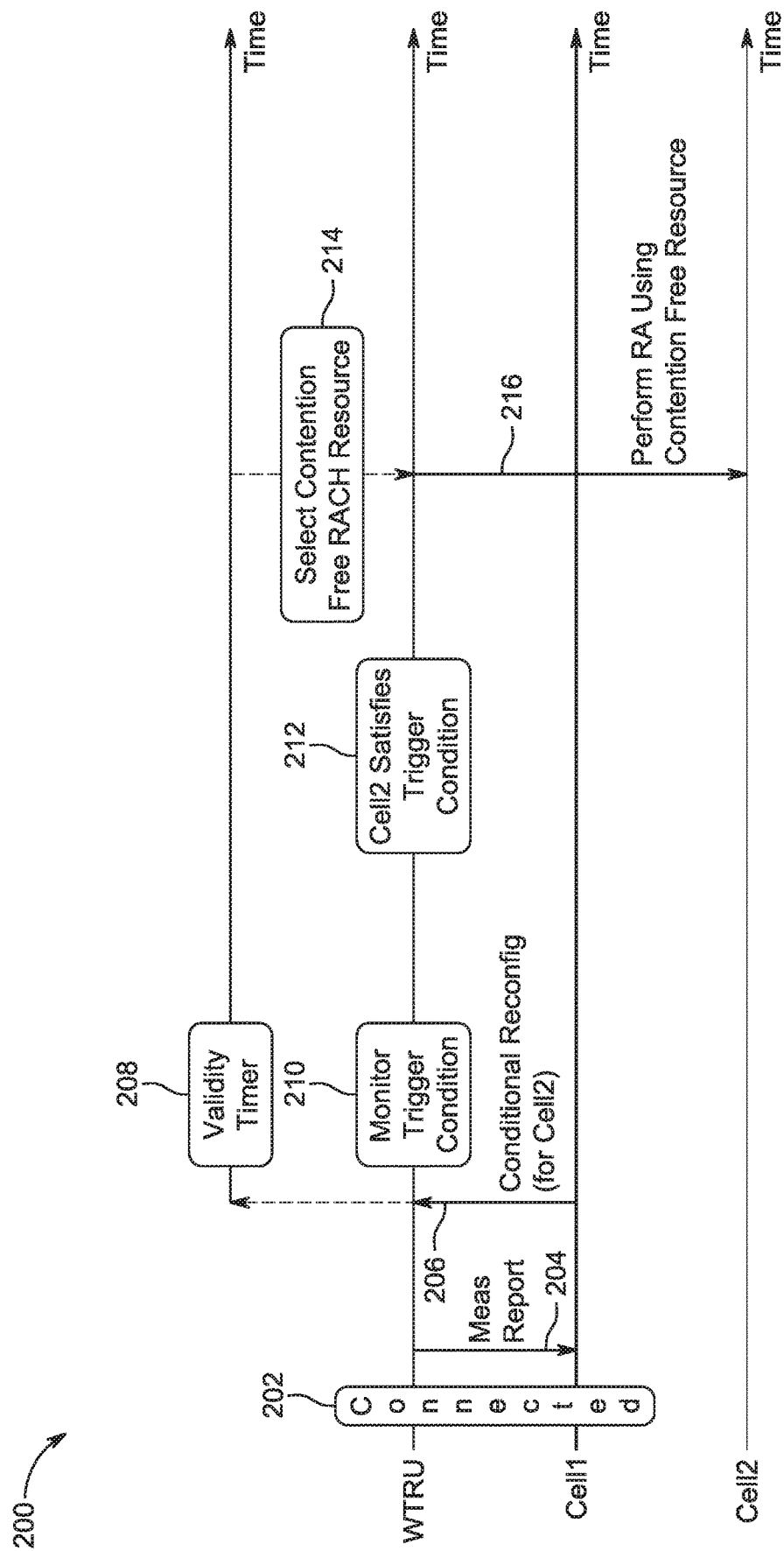
FIG. 2 illustrates an example of a trigger condition being satisfied before a validity expiration or expiry.

FIG. 2 illustrates an example configuration 200 of a trigger condition being satisfied before a validity expiration or expiry. Triggering handover at an appropriate or optimal time may be challenging as multiple steps may exist between an "impairment event" and "corrective action." In addition, a trigger handover failure may occur due to a loss of handover, handoff, or cell change command or message. Improving reliability of a handover command or message with traditional aggressive/early measurement reporting (e.g. lower thresholds/TTT) may result in early handovers, early handoffs, subsequent ping pongs, bouncing between cells, or the like. Conservative measurement reporting may result in late handovers or radio link failures.

In configuration 200, a WTRU may be in a connected state 202 with Cell1. A cell may comprise a mobile network area, coverage area, hotspot, represent a sector, a small cell, femtocell, picocell, or the like. The WTRU may be configured with triggers, events, or parameters for measurement reporting and may send measurement report 204. Cell1 may subsequently transmit or communicate a conditional reconfiguration for Cell2 206. Validity timer 208 and monitor of a trigger condition 210 for Cell2 may be started or initiated over time by a WTRU. When a trigger or other condition 212 is satisfied or met for Cell2, a contention free RACH resource may be selected (214) and random access (RA) operation is performed using contention free resources (216) for Cell2.

In examples given herein and further explained below, upon receiving a conditional reconfiguration 206 the WTRU may verify whether it may comply with such a reconfiguration. If the WTRU complies with the reconfiguration, the WTRU may store the reconfiguration and may confirm the receipt of the conditional reconfiguration by transmission of a RRC connection reconfiguration complete, reconfiguration response, or the like message. A WTRU may continue using a configuration that was active before the reception of the conditional reconfiguration or configuration. A WTRU may activate, apply, execute, or the like the reconfiguration at a later time when one or more trigger conditions are satisfied or met. A network may determine the contents of the reconfiguration message and signal it to the WTRU, while the WTRU may determine the execution or application time of the reconfiguration. A reconfiguration message may be associated with a validity criterion in time such that the conditional reconfiguration may expire after a certain amount of time if the WTRU has not determined that the reconfiguration should be applied during the period.

A decoupling of a reconfiguration transmission from an execution or application of the reconfiguration may improve the reliability of control signaling, since control signaling may be sent when the quality of the radio link is better. A decoupling may also provide a WTRU some autonomy or control of handover in the network. Such a configuration or operation may also shorten reaction time between an impairment event, such as a measurement, and a corrective action, such as a reconfiguration associated with mobility. Such a configuration may also result in a reconfiguration performed at the right time in a rapidly degrading radio condition. Also, a WTRU determining when or how to perform a corrective action may result in a faster reaction time and enable sparse transmission or measurement of reference signals for improved power savings both at the network and the WTRU.

In a beam pair link reconfiguration, such as intra-transmission reception point (intra-TRP), intra-central unit (intra-CU), or intra-cell, or a conditional beam switch, a WTRU may be configured with a beam level conditional reconfiguration associated with one or more candidate beams in addition to a serving beam. A WTRU may monitor for a trigger condition based on serving beam or one or more candidate beams, apply the beam level reconfiguration, and autonomously switch to a different candidate beam based on the trigger condition. With or without beamforming and as explained further herein, a conditional reconfiguration may also be utilized for an RRC connection inter-eNB, for an inter-CU, for a conditional HO, for an inter-RAT HO, for a conditional inter-RAT HO, to detect issues in the serving cell and trigger mobility event towards a desirable target cell, or the like.

Moreover, a conditional reconfiguration may enable operation in the new beam, for example, by configuring resources, reporting configurations, or setting up a configuration to perform control channel monitoring in the new beam. Information needed for control channel monitoring may include a control channel resource set, control channel search space, resources for UL beam training, configuration for UL control channel, or the like. In certain configurations, a WTRU may apply selective portions of a conditional reconfiguration applicable to a beam or beam group selected by the WTRU to access a target cell.

In the examples given herein, beam selection may be utilized for random access procedures with or without a conditional reconfiguration. A configuration message may be received on a BCH, such as part of system information, or on a dedicated channel, such as part of a RRC configuration procedure. The configuration message may include a mobility control information element, such as a handover command. The configuration message may also include a configuration for one or more physical random access channel (PRACH) resources that may correspond to physical resources in time, frequency, codes, or the like. The PRACH resources may correspond to a set of one or more physical resource blocks (PRBs).

The PRACH resource configuration may also be associated with a RS that may correspond to a new radio synchronization sequence (NR-SS). A NR-SS may be dedicated for the WTRU, or common to multiple WTRUs for a cell or carrier. A CSI-RS may also be dedicated for the WTRU. For example, the WTRU may receive a PRACH resource with an associated NR-SS or with an associated CSI-RS using dedicated signaling as part of a RRC configuration procedure. Moreover, when cell-specific, the WTRU may receive a PRACH resource with an associated NR-SS as part of the system information for the cell.

A PRACH resource configuration may be received in a mobility control information element, in relation to a handover command, or be related to a threshold for a measurement for the RS associated with the PRACH resource. A threshold may indicate that the WTRU may consider or find the PRACH resource suitable if a measurement of the associated RS is above the indicated threshold value. A threshold value may be known to the WTRU a priori.

A PRACH resource configuration may include a dedicated preamble sequence, such as for a CFRA procedure. The preamble sequence may be signaled as an index. For example, the WTRU may determine that an index value of 0 indicates that the WTRU MAC may select any preamble sequence within a range. For example, such range may correspond to a value between 0 and 63, 0 and 127, or another range determined as a function of the applicable or available preamble sequences for the WTRU's random access procedure. The WTRU MAC may also determine that an index value other than 0 corresponds to the indicated sequence, if the preamble index is signaled.

A beam that is common for WTRUs of a cell may be associated with a cell-specific NR-SS. A WTRU-dedicated RS, such as NR-SS or CSI-RS, may be associated with a beam that is dedicated to a WTRU in the cell, such as a narrow beam. For a contention based random access (CBRA) procedure using cell common PRACH resource(s), the WTRU may autonomously select a SS, such as NR-SS, and a corresponding PRACH resource for path loss estimation and for preamble transmission/retransmissions if the NR-SS meets or satisfies a threshold. If the WTRU does not detect a SS that satisfies a threshold, the WTRU may select any SS that allows the WTRU to meet a target received power for the random access preamble within the limit of a maximum transmit power of the WTRU. The WTRU may then select its receiver beam to find the list of SS resources or blocks that satisfy the threshold. The WTRU may be further configured to perform measurement reporting back to the network based on configured threshold, triggers, NR-SS, CSI-RS, or the like.

The WTRU may receive a configuration message or a conditional reconfiguration message that includes mobility control information from a source or serving cell to a target cell. Such a message may include an indication of how to process a RACH or PRACH configuration. An indication may specify that a random access procedure is initiated utilizing a RACH or PRACH resource with the best quality, based on a measurement value of its associated RS. Such an operation may be related to a mode such as a low latency mode. An indication may also specify that a random access procedure is initiated utilizing one or all RACH or PRACH resources with a quality above a threshold, based on a measurement value of an associated RS. Such an operation may be related to a mode such as a high throughput mode. An indication may also specify that a random access procedure is initiated utilizing a sequence of RACH or PRACH resources based on an ordering provided in the signaling.

Moreover, when utilizing RACH or PRACH resources, if there is a single resource available, the WTRU may consider the single resource for transmission. Otherwise, the WTRU may use a single bit indication to determine how to proceed with the access to the network or system. Such a determination may be applied independently of whether the resource is common or dedicated. For this configuration, the WTRU may perform a single random access procedure based on the PRACH resource associated with the best quality based on a measurement value of the associated RS, such as for low latency mode. A WTRU may also perform one attempt for each suitable resource in decreasing order of quality and until an attempt is successful, such as for high throughput mode.

Selection of RACH or PRACH resources may be applied for resources that are either common or dedicated, separately, or for one type of resource. For dedicated resources, the WTRU may perform a single random access procedure based on the RACH or PRACH resource associated with the optimal quality based on a measurement value of the associated RS. Otherwise, the WTRU may perform one attempt for each suitable resource in decreasing order of quality and until an attempt is successful. This configuration may be utilized for high throughput mode. If a random access attempt is unsuccessful, the WTRU may fallback to a common resource when available.

For certain configurations, the WTRU may initiate a reconfiguration shortly following a handover command or with some delay with a conditional reconfiguration. The reconfiguration or conditional reconfiguration message may include one or more PRACH configuration(s). The WTRU may determine the applicable PRACH resource for the initial access to the target cell using random access by determining whether there is zero, one or more RACH or PRACH configuration(s) in the mobility control information for the cell in an RRC or other control message. If there is none, the WTRU may determine that there is no dedicated RACH or PRACH configuration and may then proceed with resources in the system information when available.

If there is one RACH or PRACH configuration, the WTRU may utilize the configuration if a measurement value of an associated RS is above a threshold and initiate a random access procedure. For multiple or more than one RACH or PRACH configuration, the WTRU may determine whether there is at least one resource that is optimal for performing a random access. For example, an optimal resource may be a resource whose measurement value is above the applicable threshold. If there is one optimal resource, the WTRU may use such configuration as the measurement value of an associated RS that is above a threshold and initiate the random access procedure.

Moreover, if there is more than one optimal resource, the WTRU may determine whether to perform a single random access procedure, such as in low latency mode or multiple random access procedures. A signal procedure may include performing one for each optimal resource, given a set of multiple suitable resources. The WTRU may perform such determination based on whether or not the particular resource is associated with a dedicated preamble. If there is a single suitable resource with a dedicated preamble, the WTRU may determine that a single procedure be performed using the dedicated resources, such as for a low latency mode. If there is a dedicated preamble for a particular plurality of resources, the WTRU may determine that a single procedure be performed using the dedicated resources, such as for a low latency mode. Otherwise the WTRU may perform multiple attempts.

Moreover, if there is no dedicated preamble available, the WTRU may determine that a CBRA may be performed using the dedicated resources. In CBRA, multiple WTRUs may contend for the resource although it is for a specific beam. In this case, the WTRU may autonomously select a RS, NR-SS, CSI-RS, or the like and a corresponding RACH or PRACH resource for path loss estimation and for preamble transmission/retransmissions given a measurement value for a particular RS satisfies the threshold.

In the case of no optimal resource being found or available, a WTRU may further determine a dedicated preamble for particular resources. If there is at least one resource for which the WTRU does not have a dedicated preamble or the WTRU has received a preamble index of 0, where the WTRU MAC may select the preamble, the WTRU may determine that such dedicated resources are for a CBRA. In CBRA, the WTRU may select any contended RACH or PRACH resources based on a RS, NR-SS, CSI-RS, or the like measurements that may allow the WTRU to meet the target received power for the random access preamble within a limit of a maximum transmit power.

If the random access procedure is unsuccessful or if there is no optimal dedicated RACH or PRACH configuration, the WTRU may proceed with resources specified in system information when available. In addition, the WTRU may use a dedicated preamble if such is signaled in the received message. For example, if a RACH or PRACH resource in the system information has a counterpart in time or frequency resources in the WTRU-dedicated information but if that counterpart is further associated with a non-zero preamble sequence, the WTRU may determine that it may use the dedicated preamble for the random access procedure. For example, a dedicated configuration may include a dedicated preamble for the cell-specific resources.

A WTRU may also determine if there is a cell-specific or common RACH or PRACH configuration for a target cell such as in the system information portion of the RRC message. If available, the WTRU may use the configuration and initiate a random access procedure. Otherwise or if the random access procedure fails using such configuration, the WTRU may determine that the configuration, reconfiguration, conditional reconfiguration, handover, or the like has failed and may initiate a recovery procedure such as a cell reselection. A recovery procedure may be initiated when a timer expires, such as the T304 and no random access attempt is successful.

The examples given herein may utilize a carrier reconfiguration for an intra-eNB, secondary cell (SCell), or a conditional SCell reconfiguration. A WTRU may determine the timing of SCell addition or change based on a trigger condition. In addition, multi-connectivity inter-secondary eNB (inter-SeNB), primary SCell (PSCell), or a conditional secondary cell group (SCG) addition or change may be utilized. In a dense small cell deployment, the WTRU may move between SeNBs within the small cell layer more frequently. To prevent frequent or unreliable signaling, a WTRU may be configured with a conditional reconfiguration associated with one or more SCGs/SeNBs. The WTRU may apply the reconfiguration based on a trigger condition with or without notifying the master eNB (MeNB). WTRU may be configured to report SCells for which conditional reconfiguration does not exist. In certain examples, the WTRU may be configured with conditional reconfiguration associated with multiple distributed units (DUs) under the same CU. The WTRU may autonomously move between different DUs when the trigger conditions are satisfied. The WTRU may be configured with conditional reconfiguration that promotes or elevates a SeNB to target MeNB upon failures in the source MeNB.

Moreover, a WTRU may be configured to receive and process a conditional reconfiguration message in different modes or states, such as a connected mode or a RRC connected mode. Such as an operation may be performed after a successful security procedure or activation. This may be desirable in configuration where the network may determine the possibility of reconfiguration based on UL measurements or based on deployment knowledge. A reconfiguration may also be applicable for a WTRU in an inactive state or when the WTRU is configured with autonomous mobility such that when it moves under the coverage of a specific cell, the WTRU may perform conditional reconfiguration and move to connected mode. The WTRU may be configured to delete the conditional reconfiguration when WTRU transitions to an RRC inactive state in the serving cell. WTRU may also be configured to delete the conditional reconfiguration when RRC connection is released and WTRU transitions to IDLE state.

Still referring to states, when one or more conditional reconfigurations are active, a WTRU may perform one or more actions to monitor for the triggering conditions associated with those conditional reconfigurations. When a trigger condition is satisfied, the WTRU may perform the reconfiguration associated with that trigger condition.

A reconfiguration or configuration element may be associated with a serving cell, one or more parameters associated with a serving cell, or to a specific target. A target may be a beam, Scell, PScell, Pcell, an inter-RAT cell, a frequency, an absolute radio-frequency channel number (ARFCN), or the like. In addition, a WTRU may be configured with an implicit or explicit relation between the reconfiguration message and the configuration of a triggering condition. An implicit relation may be that the WTRU may receive both a reconfiguration and a configuration of a triggering condition within the same message. An explicit relation may be that, the WTRU may be configured to receive the reconfiguration message and the configuration of a triggering condition in a different message or multiple instances within the same message. In certain configurations, either the reconfiguration message may carry an identity associated with the configuration of the triggering condition or the triggering condition may carry an identity associated with the reconfiguration message.

A WTRU may be configured with different granularity of conditional reconfiguration. For example, a reconfiguration of physical layer parameters may include a physical channel reconfiguration, beam reconfiguration, TTI configuration, reference signal configuration, reporting configuration, control channel configuration, or the like. A reconfiguration of a user plane component may include a data radio bearer (DRB) reconfiguration, a logical channel (LCH) reconfiguration, a packet data convergence protocol (PDCP) configuration, a radio link control (RLC) configuration, a MAC configuration, a QoS flow to DRB mapping, a duplication configuration, or the like. A WTRU may also apply a reconfiguration resulting in data duplication when one or more trigger conditions are met or satisfied. With respect to security, a reconfiguration may include a key refresh, a change in algorithm, or the like.

A reconfiguration of a control plane component may impact signaling resource bearers (SRBs) such as with a split SRB configuration, a WTRU state change, a measurement configuration, an addition, modification, or removal of a Scell, a PScell, a SCG or the like. In one example, a WTRU may apply an SRB split configuration when one or more trigger conditions are satisfied. A reconfiguration of a mobility component, for example may comprise a modification of a configuration of a target cell or target frequency.

In the examples given herein, a WTRU may be configured with assistance information to reduce latency or overhead to access the target cell such as resources or a dedicated preamble needed. Assistance information may be beam specific. Configuration or reconfiguration information may include a transmission configuration for one or more DL signals or channels in the target cell including a number of sync beams, periodicity of a burst set, configuration of control beams, a periodicity resource mapping, configuration of RS such as IDLE RS and additional RS, or the like. Assistance information to acquire system information for the target cell may be utilized to directly acquire system information (SI) or utilize a resource configuration to request on-demand SI in the target cell.

Dedicated system information may be utilized in the target cell and a validity tag linked to the dedicated system information may be configured. The validity tag may be associated with the validity of the broadcast system information in the target cell. A conditional reconfiguration may include scheduling information of a target cell SI, configuration for on-demand SI request, or the like to assist with receiving the system information.

A WTRU may obtain information using a combination of delta signaling in the conditional reconfiguration message, in addition to a reference configuration that may be associated with the current serving cell configuration or another conditional reconfiguration. A WTRU may be configured with complete information for a conditional reconfiguration associated with a target frequency and different cells within the target frequency may have a delta conditional reconfiguration. Similarly, the WTRU may be configured with full configuration and delta configuration for different beams associated with a cell.

Upon receiving a conditional reconfiguration, the WTRU may verify whether it may comply with the reconfiguration. The integrity of a received message, and that the reconfiguration or monitoring of the trigger conditions does not exceed WTRU capabilities, may be verified. If the verification is successful, the WTRU may transmit an RRC response to confirm the successful reception of the reconfiguration configuration. The response may be sent even if the WTRU has not applied the reconfiguration yet or immediately. In certain configurations, the WTRU may be configured to respond to a conditional reconfiguration after receiving and verifying both the reconfiguration and the configuration of triggering condition. A WTRU may also be configured to indicate to the network via a RRC response if the WTRU is unable to comply with the received conditional reconfiguration. WTRU may be configured to store and monitor the trigger conditions if the WTRU may comply with the reconfiguration.

As illustrated in forthcoming figures, a WTRU may start to perform one or more actions to monitor for the triggering conditions associated with the received conditional reconfiguration. In certain configurations, the WTRU may not be required to monitor the triggering conditions when a serving cell trigger quantity or parameter is above a predefined threshold. For example, the WTRU may be configured to start monitoring the trigger conditions or perform neighbor cell measurements in relation to a conditional reconfiguration when the quality of the serving cell goes below a threshold. The WTRU may also be configured to start monitoring the trigger conditions or perform neighbor cell measurements in relation to a conditional reconfiguration when lower layer problems are detected in the serving cell. Lower layer failures may be based on a radio link monitoring (RLM) status, a radio link failure (RLF), a beam management failure, a beam management status or the like. The WTRU may store the received conditional reconfiguration and continue to monitor the trigger condition associated with the conditional reconfiguration while the conditional reconfiguration is valid, alive, before expiration of a timer, or the like. A valid conditional reconfiguration may indicate that a WTRU has at least one conditional reconfiguration stored, and the validity associated with the conditional reconfiguration has not expired or the conditional reconfiguration is not or has not been invalidated.

The WTRU or network may also utilize an indication of an invalidated conditional reconfiguration. The indication of the invalidated conditional reconfiguration may be an indication of what condition caused the conditional reconfiguration to become invalidated. The indication of the invalidated conditional reconfiguration may be transmitted as part of a RRC message. The WTRU may determine the validity of the conditional reconfiguration based on one or more rules. A rule may consider a validity of the conditional reconfiguration which may be associated with one or more invocations. In certain configurations, the WTRU may be configured to invalidate the conditional reconfiguration after a certain number of invocations, such as a number of successful reconfigurations upon the trigger condition. In certain configurations, a WTRU may be configured with the number of invocations to be infinity or the WTRU may be configured to retain the conditional reconfiguration until explicitly released by the network. This configuration may prevent frequent reconfiguration in case of ping/pong at a cell boundary or a beam boundary.

Another rule may address a validity of the conditional reconfiguration that may be associated with the quality of a serving cell or a target cell. For example, the WTRU may be configured to invalidate a conditional reconfiguration, if the quality of the serving or target cell falls below a threshold for a certain or preconfigured duration. Validity of the conditional reconfiguration by the WTRU may also be determined based on a characteristic or parameter associated with the target cell. For example, the WTRU may be configured to monitor a priority factor associated with the target cell. The priority factor may be broadcasted in a serving cell or read directly from a target cell. A WTRU may disable the conditional reconfiguration when the priority factor associated with the target cell is below a predefined threshold. A priority factor may also be indicative of loading in the target cell. The conditional reconfiguration may also be deleted when the target cell is barred.

More rules may address a validity of the conditional reconfiguration based on WTRU location or a timer. For example, the WTRU may consider the conditional reconfiguration to be valid only within a logical area, such as within the serving cell, within a group of cells, within a RAN area, within tracking area, or the like. With a timer, the WTRU may be configured to invalidate the conditional reconfiguration, if the trigger condition is not met or if the WTRU has not applied or executed the particular reconfiguration within the expiry of a timer. For configurations where the value of the timer is infinity, the WTRU may retain the conditional reconfiguration until explicitly released by the network.

A combination of rules may also be utilized by the WTRU to determine the validity of conditional reconfiguration. For example, the WTRU may be configured to invalidate the conditional reconfiguration after n invocations or a timer T, whichever is earlier. When multiple conditional reconfigurations are valid at the WTRU, the WTRU may be configured to apply same or different validity for different conditional reconfiguration instances. The WTRU may be configured to stop monitoring the trigger condition when an associated conditional reconfiguration is invalidated. This operation may also be performed if no other conditional reconfiguration is associated with that trigger condition. The WTRU may be configured to indicate to the network when a conditional reconfiguration is invalidated based on one or more certain or preconfigured rules.

A WTRU may delete a stored conditional reconfiguration based on an explicit command from the network. For example, the WTRU may stop monitoring the trigger condition and release the stored conditional reconfiguration upon receiving an explicit release command that references or points to the stored conditional reconfiguration. In addition, the WTRU may delete the stored conditional reconfiguration when it becomes invalid. Deletion of conditional reconfiguration may be deferred based on network response. In addition to deletion, the WTRU may modify, add, or remove a conditional reconfiguration from the reception of control signaling such as RRC control signaling.

Moreover, a measurement report may be sent by a WTRU when a conditional reconfiguration is invalidated. The WTRU may indicate which conditional reconfiguration is invalidated if multiple conditional reconfiguration is configured. In certain configurations, the WTRU may indicate the condition that invalidated the one or more conditional reconfiguration(s), for example, a timer, a measurement, or an error condition. The WTRU may transmit such an indication using an RRC message. Such an indication from the WTRU may be desirable to trigger a release of unused the resources in the target cell associated with the conditional reconfiguration.

The WTRU may be configured to override the conditional reconfiguration and the associated triggering condition. The WTRU may be configured to receive and process an immediate reconfiguration that might override the stored conditional reconfiguration. An immediate reconfiguration to a different target than the conditional reconfiguration received earlier may be received by the WTRU. For this configuration, the WTRU may override the conditional reconfiguration with the immediate reconfiguration, ignore the trigger conditions associated with the conditional reconfiguration, stop monitoring trigger conditions, and perform actions according to the immediate reconfiguration.

A WTRU may receive an explicit indication that references or points, for example carries an identity to, a valid conditional reconfiguration. In this configuration, a WTRU may immediately apply or execute the reconfiguration or configuration without waiting for the associated triggering condition. This mechanism may allow a network to trigger a handover using compressed signaling, such as a MAC control element (CE), as a conditional reconfiguration is already sent to the WTRU. The WTRU may also receive a command which may update the trigger condition associated with a stored conditional reconfiguration. For example, the WTRU may immediately apply the stored conditional reconfiguration when the trigger condition is updated to indicate immediate reconfiguration. An indication may be a value of NULL or TRUE values to a trigger condition.

A linkage between the RRC configuration that is currently active towards the serving cell and a stored conditional reconfiguration may also be utilized by the WTRU. A WTRU may be configured to delete the stored conditional reconfiguration when one or more elements or parameters related to serving cell configuration is modified. For example, when one or more DRBs are deleted in the source cell, WTRU may remove those DRBs, if any, from the stored conditional reconfiguration. A WTRU may also be configured to delete the conditional reconfiguration when one or more DRBs are removed in the serving cell.

For certain configurations, a WTRU may be configured to store or maintain at most one instance of a conditional reconfiguration at any point in time. For example, the WTRU may delete, release or overwrite the stored conditional reconfiguration, if any, upon receiving a conditional reconfiguration from the network. This setup may simplify the conditional reconfiguration handling and avoid mismatch between the WTRU and the network particularly, when multiple invocations of a conditional reconfiguration are allowed. In such configurations, one conditional reconfiguration may contain information associated with plurality of targets.

Referring again to system information, the WTRU may be configured to acquire the system information associated with the target cell. The WTRU may trigger acquisition of system information for a cell, after a predefined timer expires after a transmission of measurement report associated with that cell. The WTRU may also trigger the acquisition of system information associated with a cell after receiving a conditional reconfiguration associated with that cell. A conditional reconfiguration may also directly include the system information associated with the target cell. For example, a WTRU may receive dedicated system information in the conditional reconfiguration, which may override the broadcasted SI in the target cell. The broadcasted SI may also be overridden with the dedicated SI when the validity tag associated with the dedicated SI matches the validity tag associated with the broadcast SI.

A triggering condition may be based on comparison between a characteristic or measurement associated with a cell or beam and an absolute threshold. The triggering condition may also be based on comparison of a characteristic or measurement associated with a serving cell or with one or more target cells or beams. A characteristic may refer to a number of beams above a threshold, a metric associated with beam stability, for example, a number of beam switches over a timer interval, number of beam recovery attempts over a time interval, a number of negative acknowledgements over a timer interval, an offset factor indicative of priority or loading on a cell, or the like.

For the examples given herein, a measurement may include a metric associated with a specific type of reference signal, for example, a reference signal power including a Reference Signal Received Quality (RSRP), a reference signal quality, an interference measurement, a signal to noise and interference (SINR), a channel state measurement, a channel quality indicator (CQI), channel state information, or any combination of thereof. A measurement may be reflective of the cell quality, beam quality, beam group/set quality, quality of N best beams, quality of beams carrying control or data channels, or the like.

Figure 5:
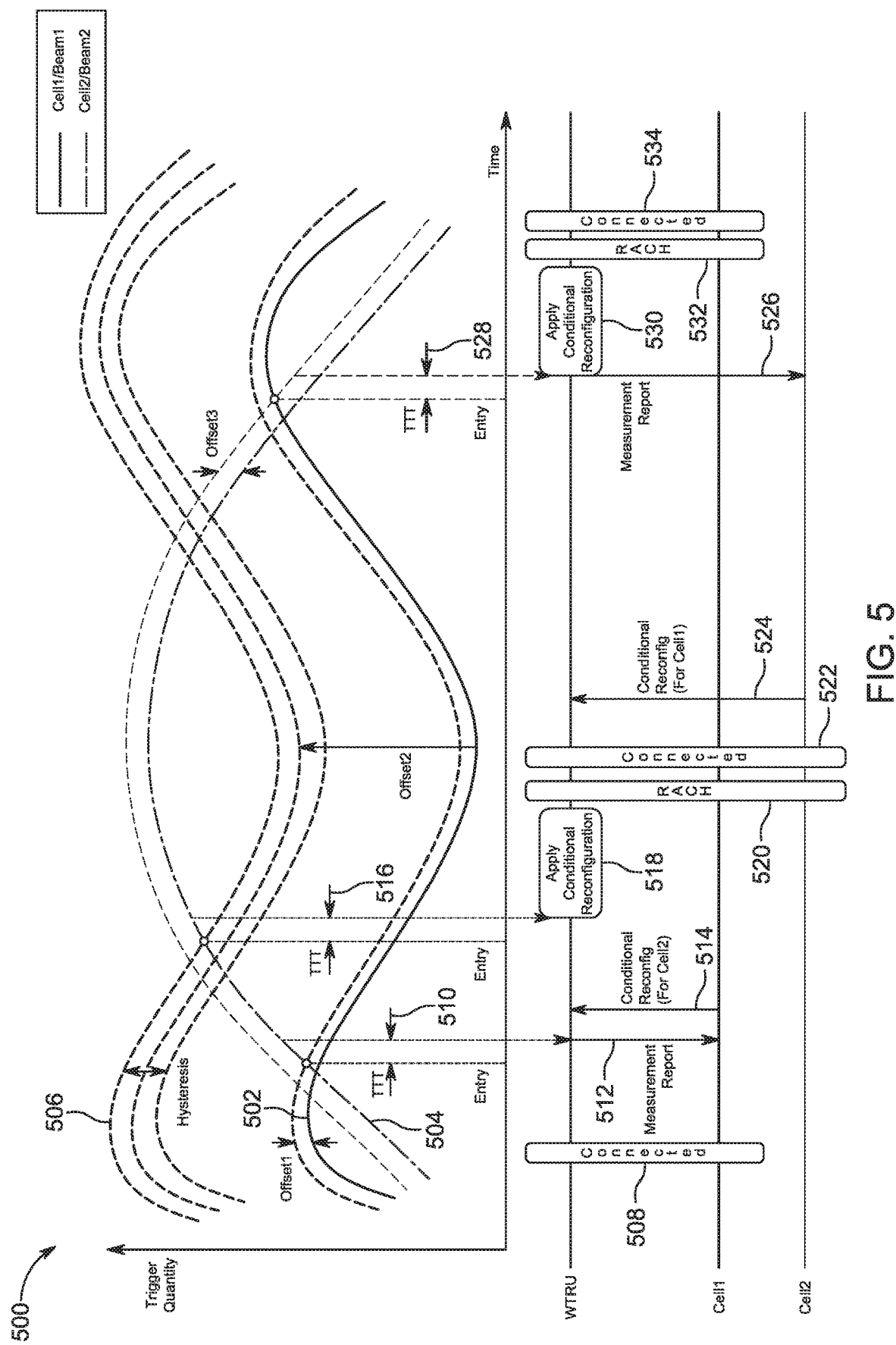
FIG. 5 illustrates an exemplary configuration and timeline for conditional reconfiguration.

A WTRU may be configured to perform the conditional reconfiguration when the measurement associated with a reference signal is above or below a predefined threshold for a certain or preconfigured time duration. As illustrated in FIG. 5, an offset or hysteresis associated with the reference signal measurement may also be utilized for reconfiguration. A WTRU may be configured to perform conditional reconfiguration when the reference signal measurement associated with the serving cell or beam(s) is above or below the reference signal measurement associated with another cell or beam(s) for a certain or preconfigured time duration.

A WTRU may be configured to transmit a measurement report when the measurement associated with a reference signal is above a first threshold and perform a conditional reconfiguration when the measurement associated with the same reference signal is above a second threshold. In certain configurations, the second threshold may be greater than or equal to the first threshold. In one example, when the first threshold is equal to the second threshold, WTRU may attempt to transmit a measurement report within a certain or preconfigured time interval after which a WTRU may execute the reconfiguration procedure.

A WTRU may be configured to measure and report a first reference signal, and perform conditional reconfiguration based on measurements of a second reference signal. For example, the first reference signal may be associated with transmission characteristics which are different from the second reference signal. In a certain configuration, the first reference signal may be a cell specific reference signal and the second reference signal may be a WTRU specific reference signal. For instance, the first reference signal may be associated with a synchronization signal block (SSblock), for example a synchronization signal, DMRS associated with PBCH or the like. The second reference signal may be a CSI-RS.

A first reference signal may also be defined for a mobility procedure, such as a mobility reference signal (MRS), and a second reference signal may be utilized to determine characteristics of the channel state, such as CSI-RS. In one configuration the first reference signal may be a cell specific reference signal and the second reference signal may be a beam specific reference signal. The first reference signal may be transmitted with the lower periodicity than the second reference signal. In a configuration, the first reference signal may be an always ON reference signal transmitted with a known periodicity or in known time resources or frequency resources. In a configuration, the second reference signal may be an on-demand reference signal transmitted when required, such as in explicitly configured time or frequency resources.

Moreover, the first reference signal may be associated with the serving cell and the second reference signal may be associated with the neighbor cell. The first reference signal may also be associated with a wide beam and the second reference signal may be associated with a narrow beam. In one configuration, the first reference signal may be associated with beams carrying sync or broadcast signals and the second reference signal may be associated with beams carrying control channels. A WTRU may also determine one or more elements or parameters related to reconfiguration or configuration for a plurality of second reference signals based on the characteristics of the first reference signal.

A WTRU may monitor multiple trigger conditions in parallel. A triggering condition may be associated with a different reference signal or different measurement of the same reference signal. A triggering condition may also be associated with different thresholds or offsets associated with the same measurement quantity and same reference signal. For example, a WTRU may be configured to monitor trigger conditions associated with two or more control channels associated with the serving cell. A WTRU may also be configured to monitor trigger conditions associated with two or more numerologies, for example, TTIs, associated with the serving cell.

In a configuration, a WTRU may be configured to perform the conditional reconfiguration when the quality of the non-serving cell is above the quality of the serving cell. The quality of the cell may be derived based on quality of N best beams associated with that cell. A WTRU may also be configured to perform the conditional reconfiguration when the quality of target cell is above a threshold and quality of the serving cell is below a threshold.

A WTRU may be configured to perform conditional reconfiguration when the number of beams greater than or equal to a predefined threshold associated with the target cell exceeds a pre-configured number. In certain configurations, the beams that carry control channels or data channels may be considered for the trigger condition. A WTRU may also be configured to perform conditional reconfiguration when the number of beams greater than or equal to a predefined threshold associated with the target cell is higher than the number of beams greater than or equal to a predefined threshold associated with the serving cell.

A WTRU may also be configured to perform conditional reconfiguration when the quality of a serving beam or one or more fallback or backup beams associated with the serving cell falls below a predefined threshold. Like other examples given herein, a WTRU may be configured to monitor multiple trigger conditions associated with plurality of control channel beams from the serving cell. Each trigger condition may be specific to a control channel characteristic or the service scheduled by the control channel.

A WTRU may be configured to perform conditional reconfiguration based on a result, outcome, or status of beam management procedures. A WTRU may receive and store multiple conditional reconfigurations each associated with a specific beam. In a configuration, the conditional reconfiguration associated with a beam may provide the configuration of RACH parameters, UL control channel parameters including the UL control beam parameters, resources for UL beam management, a control channel search space in the new beam, or the like. The outcome or status of beam management procedure may include an indication or identity associated with the beam to be utilized.

A WTRU may perform a conditional reconfiguration when the beam carrying control channel is switched from one serving beam to another beam. A WTRU may also perform conditional reconfiguration for the beam carrying control channel for the WTRU when a beam recovery procedure is different for the beam carrying control channel. In a configuration, a WTRU may perform conditional reconfiguration when a beam failure is indicated from beam management. A conditional reconfiguration may include resource configuration to perform beam recovery and a WTRU may be configured to select or apply conditional reconfiguration associated with the beams belonging to the serving cell. In addition, a WTRU may be configured to select a conditional reconfiguration associated with a target cell or neighbor cell when beam recovery fails in the serving cell.

A WTRU may also be configured to apply a conditional reconfiguration based on a trigger condition that includes beam management status of the serving cell and the quality of a target cell above a threshold. In an example, beam management status may indicate that the serving beam failed in the source cell and no candidate beam from the source cell is above a threshold. In another configuration, the beam management status may indicate that the beam recovery is not successful within a predefined time or within a preconfigured number of recovery attempts.

A WTRU may be configured to perform the conditional reconfiguration when a RLC component indicates that maximum retransmissions are reached for a SRB or DRB. Such a conditional reconfiguration may enable a SRB or DRB split between two or more cell groups, such as a SCG. In one example, such conditional reconfiguration may trigger data duplication across two or more MAC instances.

When a failure of a random access procedure is indicated from a MAC instance, a WTRU may be configured to perform the conditional configuration or reconfiguration. Such a conditional reconfiguration may activate a random access configuration that provides dedicated resources or enables more opportunities for random access. A WTRU may also be configured to perform conditional reconfiguration when the latency of an ongoing random access procedure is above a certain or preconfigured threshold. For example, a WTRU may trigger conditional reconfiguration upon receiving a random access response (RAR) with a back-off timer that exceeds the latency requirement of the service. In certain configurations, a WTRU may be configured to apply conditional reconfiguration based on errors in the layer 2 or MAC operation such as a random access problem indication, reaching a maximum number of RLC retransmissions, or the like.

A conditional reconfiguration may also enable the WTRU to perform random access in a different numerology. A different numerology may include a longer TTI, a longer preamble sequence, a different subcarrier spacing, a different cyclic prefix, utilizing resources that experience lower congestion, utilizing a configuration that provides more frequent random access opportunities, or the like. In another example, the conditional reconfiguration may enable the WTRU to perform random access to a different TRP, beam, or beam class. A beam class may be a wider beam with repetition associated with the serving cell, a TRP, or beam in a neighbor cell.

A WTRU may be configured to apply a conditional reconfiguration when a number of out-of-sync indications from the lower layers are above a threshold such as based on a parameter, counter, or timer. In a configuration, the number of out-of-sync indications to trigger conditional reconfiguration, such as counter NC310, may be lower than or equal to the number of out-of-sync indications for declaring radio link failure. In certain configurations, a WTRU may dynamically scale the value of NC310 as a function of serving cell quality or target cell quality. For example, a lower value of NC310 may be utilized when the serving cell is below a threshold or a target cell, with valid conditional reconfiguration, is above a threshold.

A WTRU may be also configured to apply a conditional reconfiguration when a timer associated with radio link monitoring process expires. In a configuration the timer associated with the conditional reconfiguration, such as timer TC310, started when a certain number of consecutive out-of-sync indications are above a threshold, may be lower than or equal to the timer associated with radio link failure such as timer T310. A WTRU may also dynamically scale the value of TC310 as a function of serving cell or target cell quality. For example, a lower value of TC310 may be utilized when the serving cell is below a threshold or a target cell, with valid conditional reconfiguration, is above a threshold. A WTRU may also be configured with trigger conditions based on problem detection at different layers. For example, the problem detection may include triggers based on RLM status, such as in-sync or out-of-sync indications), random access failures, or maximum retransmissions at RLC layer. The WTRU may be configured to apply a reconfiguration if the trigger condition associated with problem detection on the serving cell is satisfied and quality of the target cell is above a predefined threshold.

A WTRU may also be configured with the value of N310 and TC310 as a function of active services, for example, lower values may be utilized for URLLC service compared to eMBB service. A WTRU may also determine the value of NC310 or TC310 based on the buffer status associated with bearers or logical channels requiring low latency or reliability.

A WTRU may also be configured with a plurality of trigger conditions where each trigger is associated with a conditional reconfiguration. For example, a pair of (reconfiguration, trigger condition) may be associated with a target cell. Another pair of (reconfiguration, trigger condition) may be associated with each beam or group of beams associated with a target cell. When multiple trigger conditions, each associated with a different target cell, is satisfied at the same time, simultaneously, concurrently, or the like then a WTRU may select the reconfiguration based on one or more rules.

Reconfiguration that leads to lower data interruption or data loss, for example a reconfiguration without a security refresh, reconfiguration without an RLC reset, reconfiguration to the beams of the serving cell, reconfiguration to the cell of same RAN area, or the like may be configured. A WTRU may determine whether security needs to be refreshed or RLC need to be reset from the reconfiguration message.

A WTRU may be configured to evaluate trigger conditions at a certain or preconfigured time interval, evaluation period, or the like. For example, a WTRU may be configured with a timer interval based on the rate of measurements, such as a number of measurement samples per unit time, configuration of filtering parameters, or the like. If a single trigger condition is satisfied during an evaluation period, a WTRU may execute the corresponding reconfiguration associated with the trigger condition. When two or more triggering conditions fire during the evaluation period, then a WTRU may be configured to choose the reconfiguration based on certain or preconfigured rules.

A WTRU may sort target cells associated with the triggered conditions in terms of cell quality, and perform the reconfiguration associated with the target cell of highest quality. A WTRU may sort target cells associated with the triggered conditions in terms of a number of beams above a threshold, and perform the reconfiguration associated with the target cell with highest number of beams above the threshold.

A WTRU may implicitly determine the preference to a target cell based on the cell specific offset configuration, for example, a lower cell specific offset may mean high preference to such cell and the target cell may be referred to as a preferred target cell. A reconfiguration may be associated with the target cell with low load. For example, a WTRU may determine the loading from a broadcast signaling either from the serving cell or from target cell.

Prioritization rules may also be defined for different target beams, different target frequencies, different RATs, or the like. When monitoring with one or more trigger conditions, a WTRU may be further configured to prevent unnecessary configurations due to transient nature of a trigger condition. As illustrated in FIG. 5, a WTRU may be configured with a hysteresis, offsets, filtering, or the like, to smooth out short-term fluctuations in the measurement quantity. A WTRU may consider the trigger condition to be satisfied when the trigger condition stays true at least for a certain or preconfigured time, for example, a time to trigger.

As previously mentioned, a WTRU may be configured to apply a reconfiguration delayed from a time of reception of a reconfiguration command such as based on expiry of a timer. A WTRU may also be configured to apply a reconfiguration delayed from the time of transmission of a measurement report based on expiry of a timer. In such as configuration, the WTRU may be configured with two values of a time to trigger (TTT) for the same measurement event. The WTRU may trigger a measurement report upon the expiry of the first shorter TTT from the entering condition and the WTRU may trigger a conditional reconfiguration upon expiry of a second longer TTT from the entering condition. The WTRU may abort the conditional reconfiguration when the leaving condition is satisfied or when a command instructing otherwise is received from the network before the expiry of the second TTT.

A WTRU may be configured to dynamically scale the trigger conditions as a function of WTRU mobility state. For example, a WTRU may scale the evaluation period, time to trigger, filtering parameters, offset, or the like as a function of WTRU state, such that a WTRU in higher mobility state may apply the reconfiguration earlier than the WTRU in a lower mobility state. Dynamically scaling of the trigger conditions may also be based on a gradient associated with the measurement quantity. For example, a WTRU may apply the reconfiguration faster if the measurement quantity associated with the serving beam below a threshold and rate of degradation within a time interval is above a predefined threshold.

User plane and control plane components may be impacted by conditional reconfiguration messages. In the user plane, DRB continuity, MAC reset, RLC/PDCP re-establishment, PDCP, duplication implications may be impacted. In the control plane, signaling, procedures, SRB handling including direct SRP for multi-connectivity, security implications, or the like may be impacted.

A WTRU may be configured to determine whether a measurement report should be transmitted as a function of a stored configuration for conditional reconfiguration. For example, the WTRU may have a measurement configuration for measurement reporting similar to a LTE measurement configuration instead of 5G configurations, and the WTRU may further be configured with a conditional reconfiguration. A presence or validity of a first type of configuration may deactivate another type of configuration. When measurements trigger different types of WTRU procedures, for example, either measurement reporting or conditional reconfiguration (with or without an associated measurement report) it may be mutually exclusive. For example, the WTRU may determine that it should not send a measurement report triggered by the measurement configuration when it is configured with a valid conditional reconfiguration.

In certain configurations, presence or validity of a first type of configuration may deactivate one or more overlapping objects of another type. Measurements that trigger different types of WTRU procedures, for example, either measurement reporting or conditional reconfiguration (with or without associated measurement report), may be complementary for elements not common to both configurations. A WTRU may also determine to not send a measurement report triggered by the measurement configuration when it is configured with a valid conditional reconfiguration for carriers, frequencies, reference signals, measurement objects, or the like that are present in both types of configurations.

Moreover, measurement reporting may be modified when a conditional reconfiguration is valid. A WTRU may determine that it should not send a measurement report triggered by the measurement configuration when the WTRU further determines that the measurement report is triggered by a condition that is related to a serving cell of the WTRU's configuration and the WTRU has a valid conditional reconfiguration. Exemplary conditions may include a serving cell becoming worse than threshold, a serving cell offset becoming better than threshold, or the like. In such a case, the WTRU may perform a measurement reporting for an event that relates to an object that is unrelated to the serving cell's measurements. A WTRU may perform such a determination if the serving cell is a PCell of the WTRU's configuration. For example, the WTRU may initiate a measurement report trigger by the measurement reporting if the configuration event may lead to a mobility event of a cell, frequency or the like for which the WTRU may not have a valid conditional reconfiguration.

A WTRU may have a measurement configuration for a cell or frequency for which it has a conditional reconfiguration. In addition, a WTRU configured with a conditional reconfiguration may utilize a candidate measurement reporting configuration for one or more of particular carriers, frequencies, reference signals, or measurement objects. The WTRU may determine that this configuration may be used for measurement reporting triggers, instead of the measurement configuration, if any, applicable to the serving cell of the configuration of the WTRU. In a configuration, the WTRU may perform such a determination for objects related to a serving cell that is a PCell of the configuration of the WTRU. This may minimize or suppress reporting related to the particular serving cell in the presence of a valid conditional reconfiguration such that the WTRU may preferably monitor a quality of the best candidate cell for the conditional reconfiguration.

In one example, the WTRU may determine that a candidate measurement reporting configuration is valid and may start considering the particular events and triggers when a first trigger that initiates the conditional reconfiguration procedure has occurred. The WTRU may use such candidate measurement reporting configuration for mobility purposes. For example, a handover may be executed when a candidate object becomes an offset better than a serving cell, cancelling the ongoing conditional reconfiguration when a serving object becomes an offset better than a candidate object, when a candidate object becomes worse than a threshold amount, or for monitoring a different candidate such as a neighbor object which may have an offset which becomes better than a candidate object.

Suppression of measurement reports associated with one or more preconfigured events when a conditional reconfiguration is valid for a candidate or other cell may be another configuration for a WTRU. For such a configuration, measurement reports that are redundant or provide inconsequential information with respect to the valid conditional reconfiguration may be suppressed. The WTRU may also be configured to suppress measurement reports for events associated with a serving cell. Such a serving cell may be a PCell of the configuration of the WTRU, for a WTRU configured with carrier aggregation. Furthermore, the WTRU may suppress measurement reports when a serving cell is above or below a threshold, when a conditional reconfiguration is valid.

In addition, the WTRU may be configured to suppress measurement reports for events that compare a serving cell quality with a quality of one or more neighbor cells. For example, a WTRU may suppress measurement reports when a neighbor cell is better or worse than serving cell, when a conditional reconfiguration for a different neighbor cell is valid. A WTRU may also be configured to suppress measurement reports when the number of valid conditional reconfigurations or configured target cells are above a predefined threshold. In a configuration, the WTRU may be configured to suppress periodic measurement reporting, when a conditional reconfiguration is valid.

The WTRU may be configured to monitor for one or more measurement events upon receiving a conditional reconfiguration. A new measurement event may enable transmission of a measurement report when mobility towards the candidate cell associated with a conditional reconfiguration is no longer desirable or feasible. For the purpose of defining new measurement events, the WTRU may assign the role of candidate cell to one or more target cells associated with a valid conditional reconfiguration. For example, the WTRU may be configured to monitor a measurement event associated with a neighbor cell becoming better than a candidate cell for which conditional reconfiguration is valid. The WTRU may also be configured with a monitor measurement event associated with the quality of the candidate cell that goes below a threshold or an offset below the serving cell or a serving cell offset which becomes better than the candidate cell.

The WTRU may be configured to suppress measurement reports associated with a candidate cell that is no longer desirable such as when the candidate cell becomes worse than the serving cell or worse than a threshold. The WTRU may be configured to activate the measurement reports associated with the serving cell or neighbor cells when the candidate cell is no longer desirable. The WTRU may also determine the measurement events to activate or suppress implicitly based on a predefined rule or explicitly to suppress or activate certain measurements based on explicit indication in the conditional reconfiguration command.

A WTRU may apply a conditional reconfiguration within X ms, X micro-seconds (µs), X nanosecond (ns), or the like after the trigger condition is satisfied. The value of X may be configured or a maximum value of X may be predefined. The value of X may be defined such that WTRU may apply the reconfiguration earlier than a potential radio link failure. If the conditional reconfiguration does not include mobility control information, when the trigger condition is satisfied, WTRU may start to apply the reconfiguration associated with the trigger condition at an earliest opportunity no later than the time X. Upon successful reconfiguration, a WTRU may then transmit a reconfiguration complete or reconfiguration response message to the target. For example, the reconfiguration complete may include an identity of the WTRU, an identity associated with a source cell, or the like. In one example, the reconfiguration may result in a beam switch within the same serving cell and the WTRU may transmit the reconfiguration complete using the new beam. For this or other configurations, the WTRU may transmit the information about the trigger condition that caused the reconfiguration, a reconfiguration identity, or the like.

If a conditional reconfiguration includes mobility control information, then a WTRU may be configured to notify the serving cell that the reconfiguration is triggered. In one example, a WTRU may attempt to notify the network until an acknowledgement is received or a timer expires whichever is earlier. A WTRU may skip the notification to the network if the WTRU requires UL time alignment, if the serving cell quality is below a predefined threshold, if the reconfiguration specifically impacts the SCG, or the like. A WTRU may transmit the notification in a MAC CE that may carry the identity associated with the reconfiguration, a trigger condition, or the like. In another example, a WTRU may transmit the notification implicitly by transmitting a measurement report carrying the measurement result associated with the target cell or using a reserved random access preamble or any other UL signal.

When a trigger condition is satisfied, the WTRU may stop or suspend monitoring other trigger conditions or suspend further UL transmissions in the source cell. The WTRU may also use a pending UL grant for UL notification instead of data transmission. In addition, a WTRU may continue monitoring DL control channel and DL hybrid automatic repeat request (HARQ) acknowledgment (ACK) from the source cell if a notification is sent and timer is not expired. Upon receiving the response to the notification, when timer expires, or after the trigger condition when no notification is configured, the WTRU may perform one or more actions as if the reconfiguration is received from the network.

The WTRU may determine the system information applicable for the target cell if the reconfiguration message includes dedicated system information and a validity tag. In this configuration, the WTRU may compare the validity tag with the validity associated with broadcast system information from the target cell. If the validity tag matches, then the WTRU may override the broadcast system information with the dedicated system information in the reconfiguration message. If the validity tag does not match, the WTRU may acquire and apply the broadcast system information broadcasted in the target cell. Otherwise, the WTRU may acquire and apply the broadcast system information broadcasted in the target cell.

With respect to random access in a network, a WTRU may be configured with multiple dedicated random access resources as a part of conditional reconfiguration and may select a specific random access resource based on the trigger condition associated with the conditional reconfiguration. A WTRU may be configured with a dedicated random access resource per beam or beam group associated with a specific cell. In addition, a WTRU may determine the random access resource based on the beam or beam group and the cell associated with the trigger condition associated with the conditional reconfiguration.

Moreover, a WTRU may perform a random access procedure in the target cell at the first available opportunity after a reconfiguration. Upon receiving a random access response, WTRU may transmit a reconfiguration complete or a reconfiguration response to a target cell. The reconfiguration complete message may indicate if the HO triggered by explicit network command or triggered autonomously by the WTRU based on conditional reconfiguration. Additionally, a WTRU may report the trigger condition such as a serving cell quality or target cell quality, associated with the reconfiguration.

In the examples given herein, a WTRU may be configured with CFRA resources for one or more targets as part of a conditional reconfiguration. Random access resources may refer to random access preambles, an index to a random access preamble, a time resource, a frequency resource such as a configuration of a mask index, or the like. A WTRU may also be configured with a mapping between a physical cell ID and a CFRA resource such as a cell specific CFRA resource.

A WTRU may also be configured with multiple CFRA resources for a target cell. Each CFRA resource may be associated with a DL beam or group of DL beams associated with the target cell. A WTRU may also be configured with CFRA resources for a subset of beams in a target cell. In this way, the CFRA resources may include one or more beam specific CFRA resources. A WTRU may also utilize a mapping between an SSblock or a subset of SSblocks to CFRA resources, a mapping between a CSI-RS resource index or a subset of CSI-RS resource indices to CFRA resources, a mapping between a trigger condition and CFRA resources, or the like.

A WTRU may utilize or be configured with CFRA resources associated with a list of preferred, allowed, or compatible beams in a target cell. The WTRU may use CBRA resources for the beams, target cells, or trigger conditions not configured with CFRA resources. The WTRU may receive a reconfiguration or configuration of CBRA resources from system information associated with the target delivered by a serving cell or configured as a part of a conditional reconfiguration. A WTRU may also be configured with different trigger conditions for use of CFRA resources as opposed to CBRA resources associated with the same target. For certain configurations, the WTRU may be configured with a threshold or time to trigger for a trigger condition that is a function of a type of resources, such as CFRA or CBRA resources associated with the trigger condition.

A WTRU may also utilize or apply a certain or preconfigured validity period for CFRA resources as a part of conditional reconfiguration. For example, the WTRU may start a validity timer when a configuration or reconfiguration of a CFRA resource is received. The WTRU may release one or more CFRA resources upon exceeding a maximum time duration or upon exceeding a certain preconfigured number of retransmissions on the CFRA resources. Furthermore, the WTRU may release CFRA resources when the associated conditional reconfiguration is invalidated.

In certain configurations, the WTRU may determine the validity time of the CFRA resources as a function of the validity period of the associated conditional reconfiguration. For example, the WTRU may be configured to apply a validity time of CFRA resources to be equal to validity time of an associated conditional reconfiguration plus a preconfigured or predefined delta value. The delta value may be a function of the maximum expected time for a random-access procedure to be completed. For example, the delta value may be dimensioned according to the periodicity of random access resources or the maximum number of retransmission attempts. For certain configurations, the WTRU may also be configured with a validity of CFRA resources in terms of absolute time such as when the current system frame number (SFN) in the target cell exceeds a certain or preconfigured limit or range.

When a trigger condition is satisfied, the WTRU may apply the conditional reconfiguration and start a timer, such as timer T304 or the like. The WTRU may access the target cell associated with the trigger condition using selected random access resources. If the random access procedure is unsuccessful before expiry of the timer, such as T304, the WTRU may consider that the conditional reconfiguration has failed. In this configuration, the random access procedure may include an initial transmission and zero or more retransmissions, may use CFRA or CBRA resources, and may be associated with one or more beams in the target cell.

Figure 3:
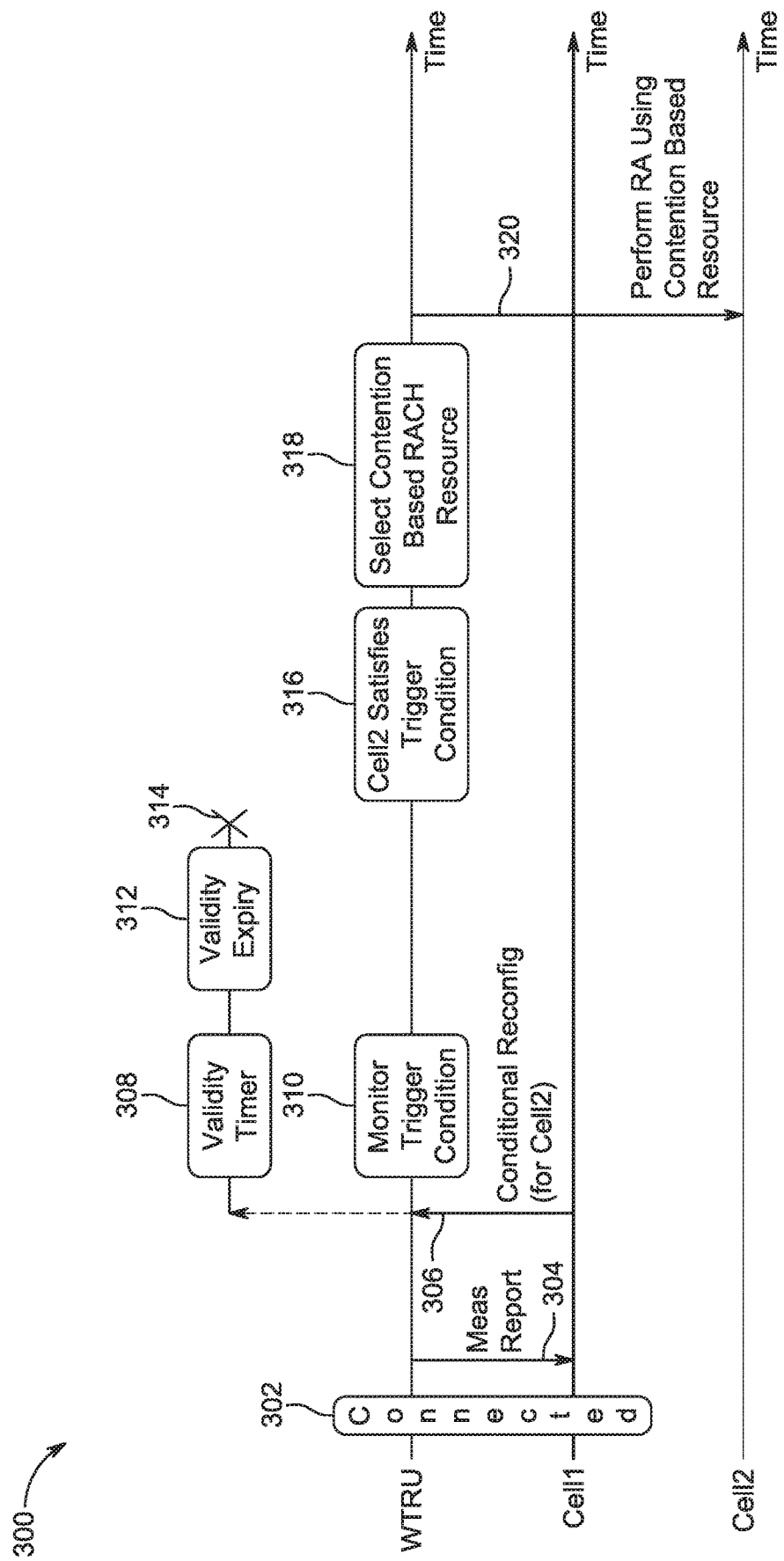
FIG. 3 illustrates an example of a trigger condition being satisfied after a validity expiration or expiry.

FIG. 3 illustrates an example of a configuration 300 where a trigger condition is satisfied after a validity expiration or expiry. A WTRU may be in a connected state 302 in Cell1. As explained elsewhere, the WTRU may be configured with triggers, events, or parameters for measurement reporting and may send measurement report 304. Cell1 may subsequently transmit or communicate a conditional reconfiguration for Cell2 306. Validity timer 308 and monitor of a trigger condition 310 for Cell2 may be started or initiated over time by a WTRU. If the validity timer expires (312) at time 314, a WTRU may still continue to monitor for a trigger condition. When a trigger or other condition 316 is satisfied or met for Cell2, a contention based RACH resource may be selected (318) and a RA performed using contention based resources (320) in Cell2.

Figure 4:
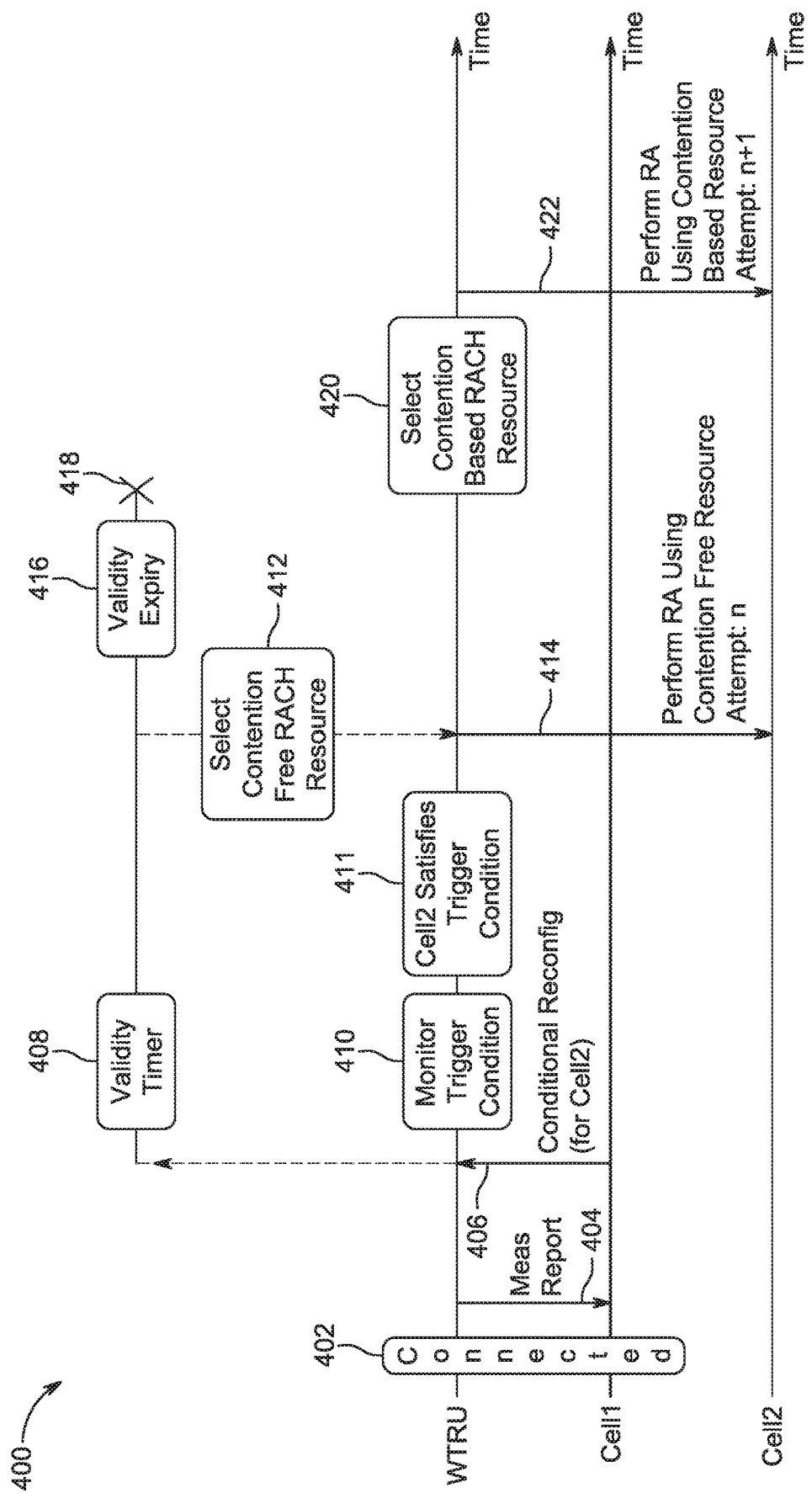
FIG. 4 illustrates a contention free random access (CFRA) validity expiry during a random access (RA) procedure.

FIG. 4 illustrates configuration 400 where a CFRA validity expires during a RA procedure. A WTRU may be in a connected state 402 in Cell1. The WTRU may be configured with triggers, events, or parameters for measurement reporting and may send measurement report 404. Cell1 may subsequently transmit or communicate a conditional reconfiguration for Cell2 406. Validity timer 408 and monitor of a trigger condition 410 for Cell2 may be started or initiated over time by a WTRU. When a trigger or other condition 411 is satisfied or met for Cell2, a contention free RACH resource may be selected (412) and a RA performed using contention free resources attempt n (414) for Cell2. If the validity timer expires (416) at time 418, a WTRU may subsequently select a contention based RACH resource 420 and perform RA using a contention based resource attempt n+1 (422).

In FIG. 4, if the CFRA preamble resource, such as a preamble index or CFRA time or frequency resource such as a mask index are configured for the trigger condition and if the validity associated with the CFRA resource has not expired, then the WTRU may select the CFRA resource in accordance with configuration 200 in FIG. 2. The WTRU may also be configured to determine the validity of a CFRA resource for each random access occasion. In configuration 400, the validity of CFRA resource may expire during a random access retransmission.

In the examples given herein, the WTRU may ensure that a configured CFRA resource is valid before one or more random access attempts including retransmission attempts. In addition, the WTRU may fall back to a CBRA resource if the validity associated with CFRA resource expires before the random access occasion is set to occur. A WTRU may also be configured with a maximum retransmission attempt associated with a CFRA resource. In this case, the WTRU may stop the validity timer associated with the CFRA resource when the maximum retransmission attempt is met or exceeded.

Configurations 200, 300, or 400 may be extended for multi-beam scenarios. For instance, a WTRU may be configured with CFRA resources specific to a beam or subset of beams instead of cell specific CFRA resources. When a trigger condition is satisfied, the WTRU may be configured to access the target cell on one or more random access resources associated with a subset of beams. The WTRU may also determine that such beams may be selected based on a quality of one or more DL beams associated with the target cell, for example, realized as measurements of reference signal associated with SSblock(s) or CSI-RS resource(s).

Moreover, the WTRU may be configured to prioritize one or more beams associated with the target cell for which CFRA resources are valid. Prioritization may be based on when the quality of such beams is above a predefined threshold. For instance, N best or preferred beams within a relative threshold with respect to the top beam or for which are above a predefined absolute threshold may be determined. The WTRU may also be configured to select a first CBRA resource over another CFRA resource when the quality of the beam associated with the first CBRA resource is an offset or margin better than the beam associated with the another CFRA resource. A target beam as a function of current serving cell beam or groups may be determined and correspondingly the trigger condition associated with the conditional reconfiguration. A WTRU may also access the target cell utilizing the beams that are involved in a determination of target cell quality. The WTRU may also select beams for a target cell that are on a whitelist, not explicitly blacklisted, or the like.

Upon failure or inability to receive a response to a transmitted random access preamble, the WTRU may perform retransmissions with power ramping. A different or larger power ramping step for a CFRA resource verses a CBRA resource may be utilized by the WTRU. In addition, a WTRU may be configured with a given number of maximum RACH retransmission attempts per CFRA resource. The WTRU may be configured to select a second CFRA associated with a different beam, when a maximum retransmission associated with a first CFRA is exceeded. After exhausting CFRA resources, the WTRU may then select a CBRA resource to perform RA procedure. The WTRU may be configured with an overall maximum number of retransmission attempts that include transmissions on one or more beams using CFRA or CBRA resources for a given target cell. Upon exceeding the overall maximum number of retransmission attempts or upon expiry of a guard timer such as T304, whichever is earlier, the WTRU may determine that the conditional reconfiguration has failed, is incomplete, or the like.

In certain configurations, the WTRU may be configured to select the earliest occurring random access resource such that overall latency to access the target cell is minimized. Among multiple configured CFRA resources, that may be associated with different beams, the WTRU may select the earliest occurring CFRA resource to perform initial preamble transmission when accessing the target cell. Moreover, upon failure of preamble transmission on a first CFRA resource, the WTRU may transmit a random access preamble on a second CFRA resource, which may or may not be associated with a different beam, instead of waiting for the next periodic occurrence of the first CFRA resource for retransmission. For example, the WTRU may select a CBRA resource when the earliest CFRA resource occurs at a time greater than or equal to parameter T that corresponds to expected time for the reception of RAR associated with a CBRA resource.

In certain configurations, the WTRU may be configured to perform multiple preamble transmissions, for example, in RACH occasions associated with multiple beams, before the start of a time window associated with RAR monitoring. The WTRU may be configured to transmit multiple preambles associated with a plurality of CFRA resources before monitoring for a RAR. Upon exceeding a certain or preconfigured number of preamble transmissions, including initial transmissions and retransmissions thereof on CFRA resources, the WTRU may be configured to perform preamble transmissions on a CBRA resource. Preambles associated with a mix of CFRA and CBRA resources may be transmitted such that the overall number of preambles transmitted before the RAR window is below a predefined number.

The WTRU may be configured with multiple random access resources each associated with a CSI-RS resource in the target cell. A one to many mapping between a SS-block and a plurality of CSI-RS resources, that may be quasi-co-located for the target cell, may also be utilized. When a trigger condition associated with a SSBlock or groups is satisfied, the WTRU may be configured to transmit multiple preambles associated with the CSI-RS resources for such a SSBlock or groups thereof. This operation may be desirable to reduce the latency associated with high gain beamformed links utilized by a WTRU or network.

A WTRU may determine whether the reconfiguration is conditional or immediate based on the presence of a trigger condition parameter or element. If a trigger condition is not present, WTRU may process and apply the reconfiguration immediately. Otherwise, a WTRU may perform actions specified for conditional reconfiguration. A WTRU may also verify whether it may comply with the conditional reconfiguration. Compliance may include whether the WTRU may monitor the trigger conditions while performing functions associated with a serving cell and whether a WTRU may apply the reconfiguration if hypothetically the condition is satisfied at a certain or preconfigured time instant. The WTRU may transmit a conditional reconfiguration response indicating compliance with the received conditional reconfiguration to the network or other device. A WTRU may continue using the current configuration associated with the source cell, for example, when a reconfiguration is not applied immediately.

FIG. 5 illustrates an exemplary configuration and timeline 500 for conditional reconfiguration. A WTRU in a connected state 508 in Cell1 may be configured with triggers, events, or parameters for measurement reporting. When the trigger conditions for measurement reporting is satisfied, a WTRU may transmit a measurement report 512. For example, Cell2 may be an offset1 better than serving Cell1 in trigger quantity based on Cell1/beam1 curve 502 for a predefined, predetermined, or calculated time duration. A graph of a trigger quantity for Cell2 may be represented by Cell2/beam2 curve 504. Graph 506 shows hysteresis associated with a reference signal measurement for Cell1/beam1.

After TTT 510 and upon transmitting the measurement report 512, WTRU may receive conditional reconfiguration 514 that includes reconfiguration with mobility control information for Cell2 514 and one or more trigger or event conditions to perform such reconfiguration. The conditional reconfiguration with mobility control information may include SI associated with the target Cell2. A TTT may be utilized to determine a period for a trigger quantity curve for a cell to stay above another cell prior to a WTRU applying reconfigurations. A TTT may be set by the network and have a related offset that a WTRU may compare to an absolute value. When the trigger conditions are satisfied for conditional reconfiguration, in this example the Cell2 may be offset2 higher than the Cell1 for a predefined, predetermined, or calculated time duration, the WTRU may apply the conditional reconfiguration 518 associated with Cell2. In certain configurations, a WTRU may be configured to dynamically scale the trigger condition, such as offset2 or TTT 516, as a function of serving cell quality.

A WTRU may perform a random access procedure on a RACH 520, with or without dedicated preambles, if indicated or included in a conditional reconfiguration. A WTRU may also send a conditional reconfiguration complete message. Upon successful reconfiguration, a WTRU may perform operations associated with connected state 522 in target Cell2. In the connected state, a WTRU may receive a conditional reconfiguration from Cell2 for Cell1 524 without first sending a measurement report. Such conditional reconfiguration may configure the WTRU to indicate to the Cell2 when trigger condition is satisfied. For this configuration, a WTRU may transmit a measurement report 526 to Cell2 when the conditional reconfiguration associated with Cell1 is satisfied based on offset3 and TTT 528. A WTRU may then apply the conditional reconfiguration 530 with mobility control information towards Cell1, perform a RACH operation 532, and enter connected state 534.

Figure 6:
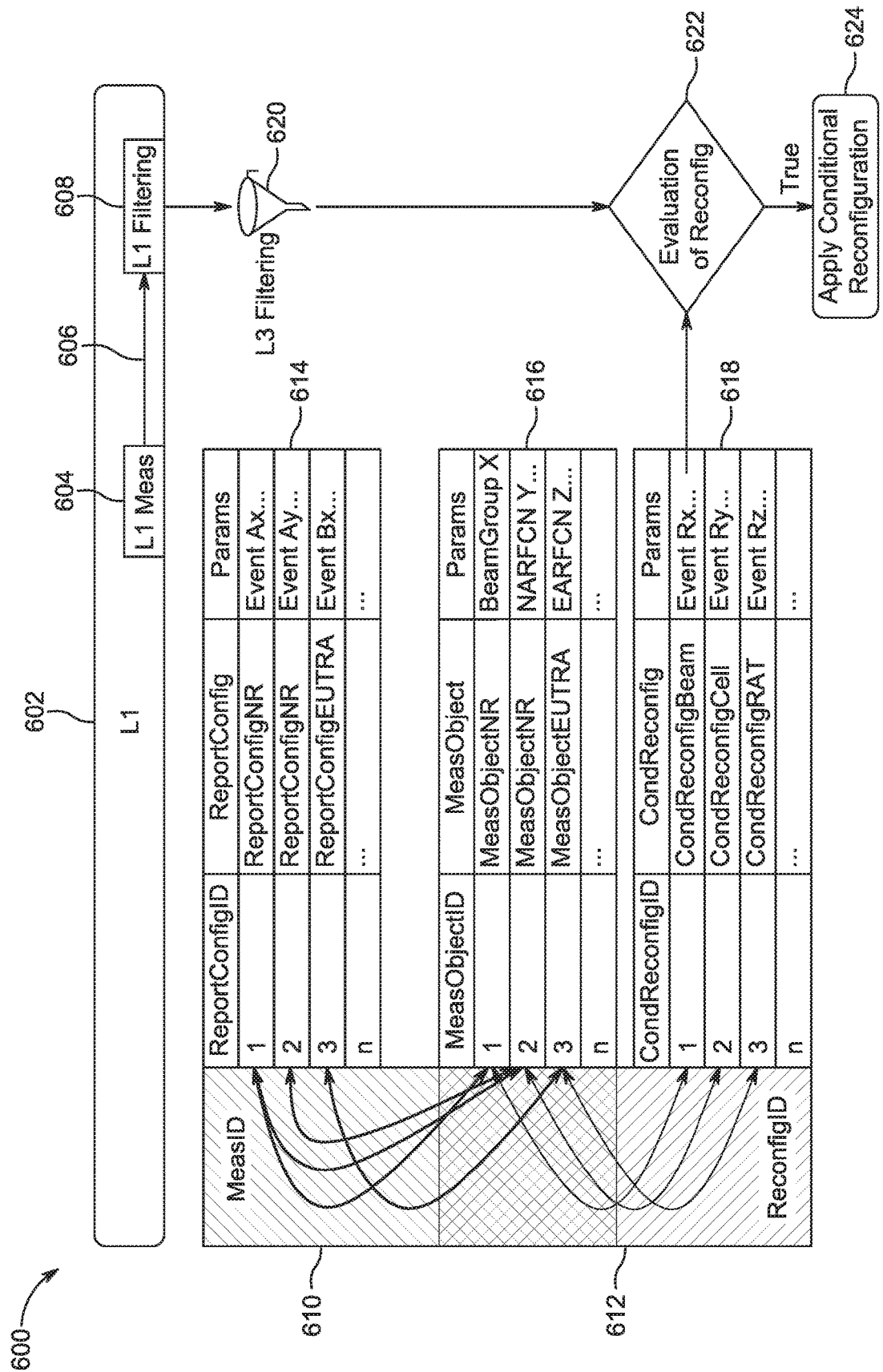
FIG. 6 illustrates a WTRU configured with a joint framework for both a conditional reconfiguration and measurement reporting.

FIG. 6 illustrates a WTRU configured with a joint framework for both a conditional reconfiguration and measurement reporting 600. The WTRU may be configured with a list of measurement objects 616 and a list of measurement identities 610 (reportConfigID) that link measurement objects to a reportConfig. A reportConfig object or element may include events or conditions to be satisfied to trigger a measurement report on that or a given measurement object. The list of measurement objects 616 and a list of conditional reconfiguration identities 618 (condReconfigID) may also be linked in reconfigID 612. A condReconfigID may include events that need to be satisfied to apply a corresponding reconfiguration associated with that or a given measurement object.

In conditional reconfiguration and measurement reporting 600, a Layer 1 (L1) 602 filtering 608 may be performed based on a result 606 of a L1 measurement 604. Layer 3 (L3) filtering 620 may be utilized to determine if one or more events of a conditional reconfiguration are met or satisfied 622. In conditional reconfiguration and measurement reporting 600, L1 filtering 608 and L3 filtering 620 may be performed so that measurement results are reliable or stable and any transient impairments may not trigger reporting or a mobility event. If true for at least a TTT, the conditional reconfiguration is applied 624.

In certain configurations, a single measurement object may be linked to both a reporting configuration and a conditional reconfiguration. In addition, a WTRU may receive signaling messages that modify, delete, or alter a stored conditional reconfiguration. A signaling message may reference the stored conditional reconfiguration using the condReconfigID. The WTRU may be configured to report the reconfiguration when the trigger condition is satisfied and may reference the conditional reconfiguration using the condReconfigID associated with such reconfiguration in a report.

Figure 7:
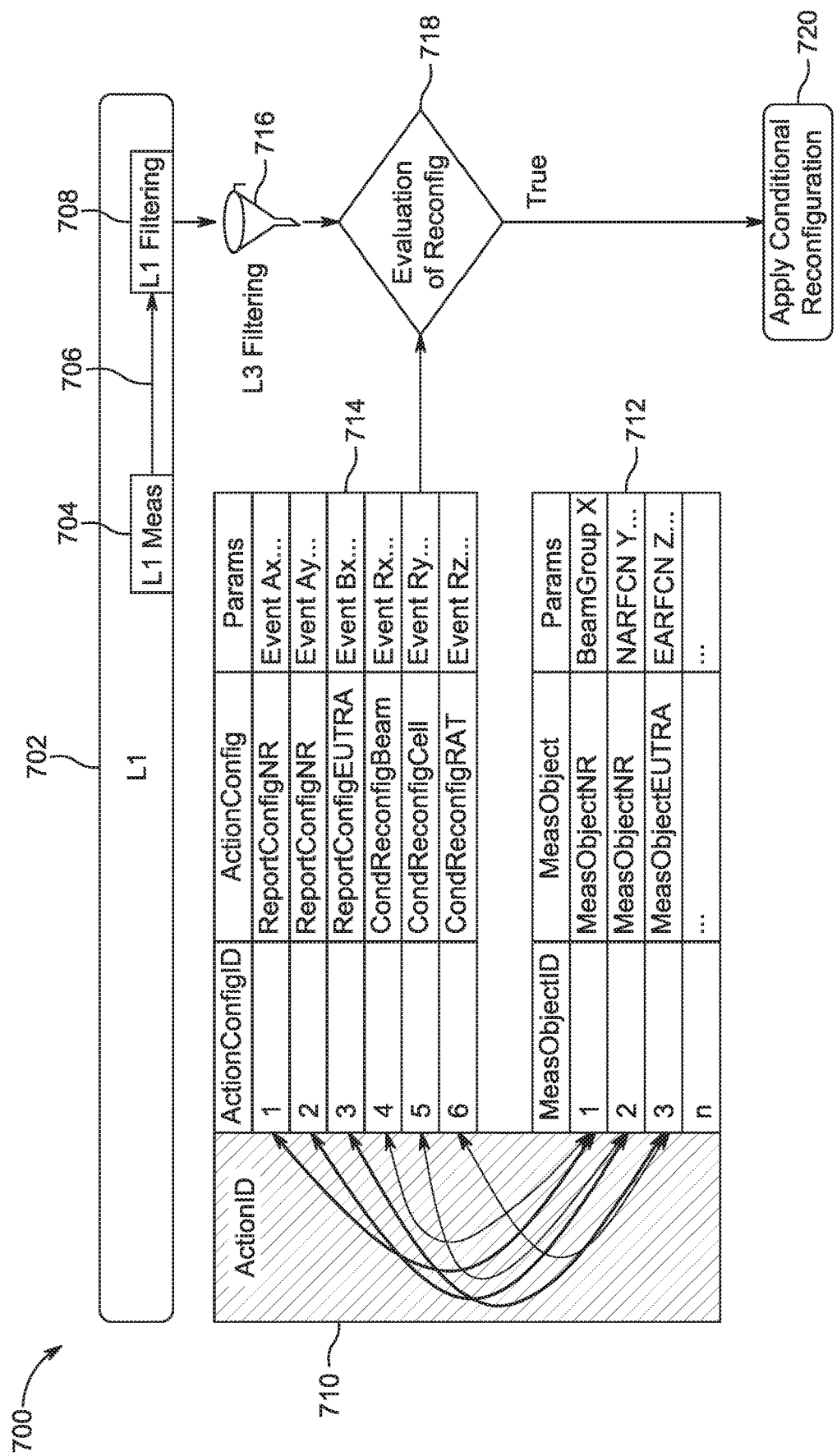
FIG. 7 illustrates a WTRU configured with a list of measurement objects and list of action identifiers (IDs)

FIG. 7 illustrates a WTRU configured with a list of measurement objects and list of action IDs 700. Action IDs 710 may link a measurement object(s) 712 to an action configuration(s) 714. An action configuration may be flexible to indicate different types of action including measurement reporting, conditional reconfiguration, deletion of the measurement objects, or the like. A WTRU may use the action IDs to report measurements or to report a conditional reconfiguration event.

A single measurement object may be linked to both report configuration and conditional reconfiguration each associated with the same trigger event. In this configuration, a WTRU may first attempt to transmit a L1 measurement report 704 at L1 702 associated with the measurement object. L3 filtering 716 may be performed using L1 filtering 708 and result 706 to determine if one or more events of a conditional reconfiguration are met or satisfied 718. In list of measurement objects and list of action IDs 700, L1 filtering 708 and L3 filtering 716 may be performed so that measurement results are reliable or stable and any transient impairments do not trigger reporting or a mobility event. If true for at least a TTT, the conditional reconfiguration 720 is applied. The WTRU may also trigger the conditional reconfiguration 720 at the earliest of either a predefined timer expiry or upon successfully transmitting the measurement report.

Figure 8:
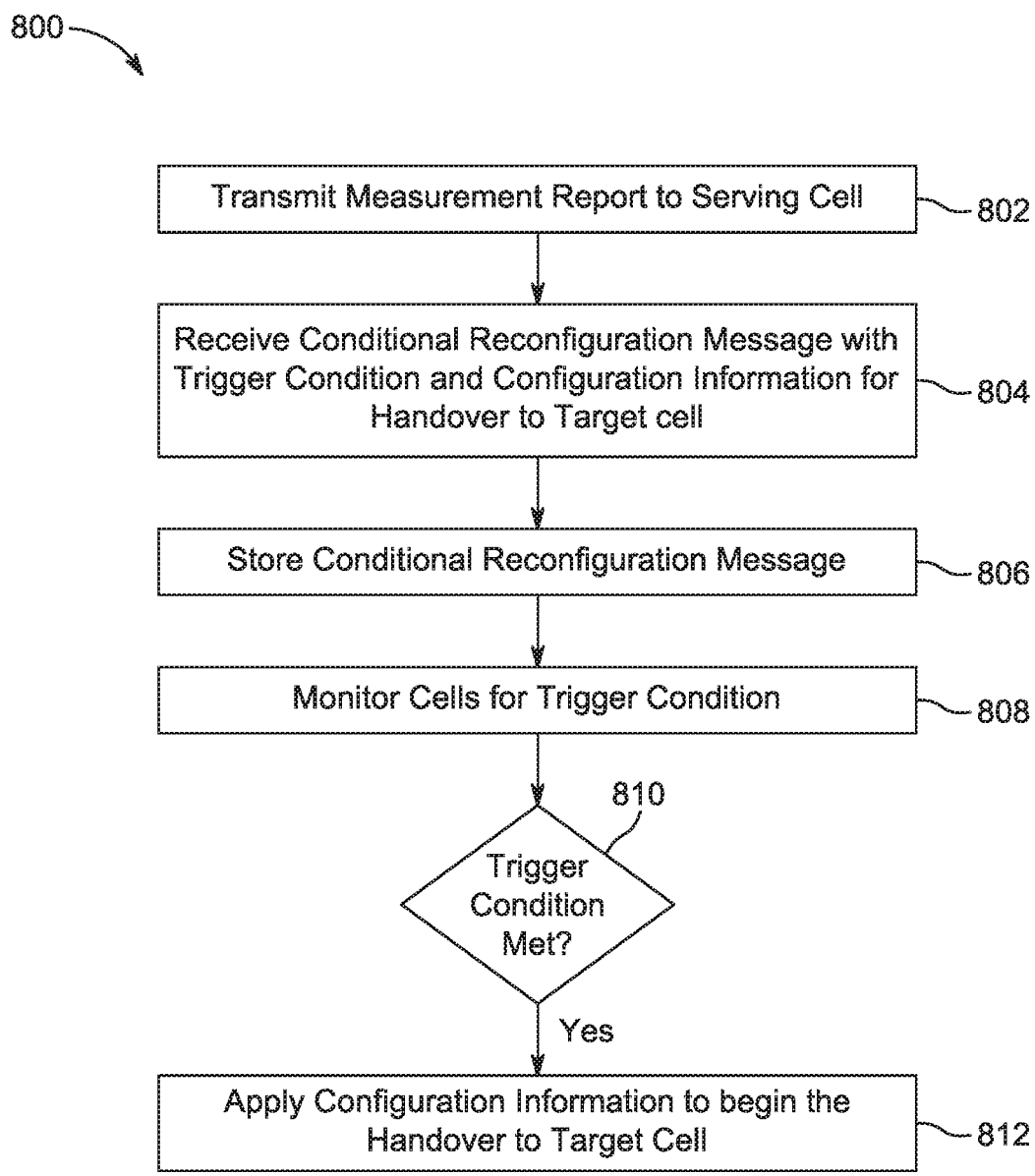
FIG. 8 illustrates a WTRU and network utilizing a conditional reconfiguration.

FIG. 8 illustrates a WTRU and network utilizing a conditional reconfiguration 800. A WTRU may transmit a measurement report to a serving cell (802). The WTRU may receive, from the serving cell based on the measurement report, a conditional reconfiguration message that includes a trigger condition and configuration information for handover to a target cell (804). The conditional reconfiguration message may be stored (806) and the WTRU begins to monitor the serving and target cells for the trigger condition (808). When the trigger condition is met (810), the WTRU may apply the configuration information to begin the handover to the target cell (812).

A WTRU may be configured to perform actions associated with radio resource management (RRM) measurement reporting based on a status of a stored conditional configuration or reconfiguration. For example, a WTRU may suspend transmission of measurement reporting associated with a cell for which a valid conditional reconfiguration is stored. The WTRU may also be configured to report measurements specifically for the measurement objects for which a valid conditional reconfiguration doesn't exist.

A periodic measurement report may be suspended when a conditional reconfiguration is received and is valid. With an existing and valid conditional reconfiguration message, a measurement report may be suspended when a target or any cell becomes better than the serving cell. In addition, the WTRU may be configured to transmit an event triggered measurement report when a new cell becomes better than the target cell for which conditional reconfiguration already is received and valid. Such restrictions or requirements may be excluded for measurement reports indicating the start of a conditional reconfiguration procedure.

WTRU measurement reporting may depend on support, presence of a stored conditional reconfiguration, status of a stored conditional reconfiguration, or the like. For example, a WTRU may be configured with a new measurement event or measurement reporting rules that enable comparison of a measurement result associated with a neighbor cell or a serving cell to a candidate cell for which a conditional reconfiguration is valid. This configuration may reduce the amount of measurement reports that are redundant, inconsequential, or the same.

In the example given herein, a WTRU may be configured with baseline measurement events designated as A1-A6 as given in Tables 1 and 2. The WTRU may also be configured with a measurement event A3M to report a neighbor cell measurement for the purpose of conditional reconfiguration. The WTRU may be configured with a new measurement event or a new instance of an existing event with a lower threshold or early triggering point. As already given herein, the WTRU also may be configured with two measurement identities for the same measurement object or with two different reporting configurations for the same event. For example, the WTRU may be configured with one reporting configuration with lower offset and a conditional configuration with a higher offset. The WTRU also may be configured with two measurement identities for the same measurement object, with two different reporting configurations and two different events, for example, an A3M event for reporting and an A3 event as a conditional handover trigger.

A WTRU may also be configured with one or more new measurement events in addition to a set of events designated as A1-A6. A WTRU may transmit measurement reports associated with the new measurement events to indicate or update the status of one or more candidates configured as a part of conditional reconfiguration. A WTRU may be configured with a measurement event M1 to detect and report that a new neighbor cell becomes better than the candidate associated with a stored conditional reconfiguration. The WTRU may be configured with a measurement event M2 to detect and report that the serving cell has become better than the candidate associated with a stored conditional reconfiguration. The WTRU may be configured with a measurement event M3 to detect and report that candidate associated with a stored conditional reconfiguration has gone below a threshold.

Table 1 includes exemplary WTRU behavior associated with measurement handling during conditional reconfiguration. Parameter S may denote a serving cell measurement quantity and N1, N2 may denote a quality of neighbor cells. In the examples given herein, a WTRU in a low mobility state or in a large cell deployment may be configured with measurement handling associated with Configuration 1, as the candidates are not expected to change frequently. For a WTRU in a high mobility state or in ultra-dense deployment scenarios, the WTRU may be configured with measurement handling associated with Configuration 2.

TABLE 1

| Measurement Results | Configuration 1 | Configuration 2 |
|---|---|---|
| Initial state, S > Threshold | Activate = A1-A5 & A3M | |
| N1 > S | ⇒ A3M Report ⇒ Receive conditional reconfiguration for N1 | ⇒ A3M Report ⇒ Receive conditional reconfiguration for N1 Candidate = N1 Activate = M1, M2, [A3] Suppress = A3M, A1, A2, A4 |
| N2 > S, but N2 < N1 | ⇒ A3M Report | ⇒ No M1. No report |
| S < T S > Offset + N1 | ⇒ A1 Report ... | ⇒ No Report. Activate = A3M, A1, A2, A4, A3 Suppress = M1, M2 |
| ... N1 > S + Offset | ... | ... Execute conditional HO |

TABLE 2

| Event | Description |
|---|---|
| A1 | Serving becomes better than threshold |
| A2 | Serving becomes worse than threshold |
| A3 | Neighbor becomes offset better than PCell/PSCell |
| A4 | Neighbor becomes better than threshold |
| A5 | PCell/PSCell becomes worse than threshold1 and neighbor becomes better than Threshold2 |
| A6 | Neighbor becomes offset better than Scell |
| B1 | Inter RAT neighbor becomes better than threshold |
| B2 | PCell becomes worse than threshold1 and inter RAT neighbor becomes better than Threshold2 |
| A3M | Neighbor becomes offset1 better than serving |
| M1 | Neighbor becomes offset better than candidate |
| M2 | Serving becomes offset better than candidate |
| M3 | Candidate becomes worse than threshold |

Upon entering connected mode, the WTRU may be configured or utilize measurement events A1-A5 and an additional event A3M when conditional reconfiguration is supported by the WTRU. When a neighbor has a potential for conditional reconfiguration, for example N1>S (identified by event A3M), the WTRU may trigger a measurement report. In certain configurations, event A4 may be utilized instead of A3M to identify a potential candidate. Upon receiving a conditional reconfiguration associated with N1, a WTRU configured with Configuration 2 may assign the role of candidate cell for N1.

A WTRU configured with Configuration 2 may further activate measurement events M1/M2 to monitor the status of one or more candidates and suppress events A3M, A1, A2, and A4 to avoid transmission of redundant or inconsequential measurement reports. Table 1 illustrates that a WTRU configured with Configuration 2 may not trigger subsequent event A3M for a different neighbor or an A1 event associated with a serving cell. Subsequently, when the candidate cell becomes worse than the serving cell, the WTRU may revert to the measurement events associated with the serving cell and suppress the measurement events associated with the candidate cell. This scenario also shows a successful execution conditional reconfiguration when N1 becomes an offset better than the serving cell.

In the examples given herein, a WTRU may include the measurement results for one or more beams associated with a neighbor cell in a measurement report. The WTRU may include the results of beams involved in the determination of a target cell quality. The WTRU may include the beam identities, for example, SSblock identities or a CSI-RS resource identity arranged or sorted in order of beam quality with or without including explicit beam measurement results. The number of beams to include in a measurement result may be a function of the neighbor cell quality and may be related to the best neighbor cell.

For conditional reconfiguration, a WTRU may be configured to monitor the applicability of one or more dedicated resources and may report to the network when such dedicated resources are no longer applicable, usable, needed, or the like. For example, the WTRU may be configured with contention free resources which may be specific to one or more beams associated with a target cell. A WTRU may perform a monitoring operation when dedicated resources are configured and may include measurements of reference signals corresponding to the target cells and one or more DL beams thereof for which the dedicated resources were configured.

The WTRU may be configured with measurement events to indicate a change in the status of target cell beams with respect to a previously transmitted measurement report. This operation may be performed when one or more beams that were utilized to derive the neighbor cell quality was different from a previously transmitted measurement report or when the latest cell quality of a target neighbor cell would not trigger a measurement report. This scenario may be applicable if the latest cell quality is not significantly different from previously reported cell quality or if there is no configured measurement event that would otherwise trigger a measurement report based on cell quality.

The WTRU may additionally be configured with a measurement event to indicate a change in the status of target cell beams with respect to a previously transmitted measurement report. This operation may be performed if WTRU has received a configuration, including a conditional reconfiguration, for CFRA resource associated with one or more beams in a previously transmitted measurement report and it is no longer applicable for the latest neighbor cell quality determination. Such a report may be desirable to release CFRA resources associated with beams that are no longer relevant, used, needed, or the like.

The WTRU may also be configured with a measurement event to indicate a change in the status of target cell beams with respect to a previously transmitted measurement report when the WTRU does not have a valid CFRA resource associated with one or more beams involved in the neighbor cell quality determination. Such a report may be desired to obtain a CFRA resource associated for one or more preferred beams. In certain configurations, the WTRU may be configured to indicate to the network when one or more beams that constitute N best beams of a target cell changes, even though the target cell quality does not change. This may occur when dedicated or contention free resources may be configured for such beams.

In the examples given herein, a WTRU may be configured to apply the conditional reconfiguration as a function of specific DRBs, QoS flows, or the like. For example, the WTRU may apply conditional reconfiguration when one or more "trigger conditions" are satisfied while there is data pending to be transmitted for one or more preconfigured DRBs. The WTRU may also be configured to apply a conditional reconfiguration when one or more trigger conditions are satisfied when the WTRU buffer status is above a predefined threshold, a packet delay budget is above a threshold, when the number of NACKs/retransmissions are determined to be above a predefined threshold, or the like.

Moreover, when a conditional reconfiguration fails, for example if the WTRU cannot access the target cell, the WTRU may use a conditional reconfiguration associated with the next best target cell. This operation may be performed if such a conditional reconfiguration exists and the trigger condition associated with the target is satisfied. Upon failure of a first conditional reconfiguration, the UE may also apply a second conditional reconfiguration if the trigger condition associated with the second conditional reconfiguration is satisfied. The WTRU may be configured to retry conditional reconfiguration with same or different target until a preconfigured time has elapsed since the WTRU may have stopped reception in a serving cell or the trigger condition to leave the serving cell may already be satisfied. Upon such elapsed time, such as expiry of a timer, the WTRU may leave connected mode and perform cell selection.

When the beam level conditional reconfiguration with the serving cell fails, the WTRU may perform conditional reconfiguration associated with another cell or another frequency. In addition, when a conditional reconfiguration fails, the WTRU may restore the configuration last used in the serving cell and indicate to the serving cell the failure of conditional reconfiguration. A WTRU may also include the identity associated with the failed conditional reconfiguration and the trigger condition. In certain configurations, a WTRU may go back or revert to the serving cell when the serving cell is above a predefined threshold.

Moreover, the WTRU may perform cell selection upon a conditional reconfiguration failure or radio link failure. If a WTRU determines that the conditional reconfiguration for the selected cell exists and valid or not expired, then the WTRU may perform actions as if trigger conditions are satisfied towards that selected cell. For example, the WTRU may transmit an RRC reconfiguration complete indicating successful conditional reconfiguration to the target cell instead of a re-establishment request, if a valid conditional reconfiguration exists for such target cell. In certain configurations, following the failure to perform a conditional reconfiguration, the WTRU may initiate a connection re-establishment procedure upon the determination of a radio link failure in the source cell using the configuration applicable before the conditional reconfiguration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
a transceiver; and
a processor;
wherein the transceiver is configured to receive, from a network node associated with a serving cell, a conditional reconfiguration message that includes information indicating a trigger condition and configuration information for performing handover to a target cell based on a determination that the trigger condition is met, wherein the trigger condition is met when a number of beams associated with the target cell that have a measured signal quality above a signal quality threshold exceeds a threshold number of beams; and
wherein the processor and the transceiver are configured to perform the handover to the target cell on a condition that the trigger condition is met before a time period has elapsed.

2. The WTRU of claim 1, wherein a signal quality measurement report associated with the target cell is suppressed until the WTRU determines a signal quality measurement associated with the target cell exceeds a higher offset from a signal quality measurement associated with the serving cell.

3. The WTRU of claim 1, wherein the configuration information is used to begin the handover to the target cell on a condition that the trigger condition is met after the time period has elapsed.

4. The WTRU of claim 1, wherein a random access procedure, utilizing a contention free random access channel (RACH) resource selected by the WTRU, is performed on the target cell after the configuration information is applied.

5. The WTRU of claim 1, wherein the information indicating the trigger condition includes another trigger condition based on a trigger quantity value for performing handover to the target cell, wherein the handover procedure begins on a condition that a measured signal quality of a beam associated with the target cell is offset by at least a predetermined amount from the trigger quantity value.

6. The WTRU of claim 1, wherein at least one of the information indicating the trigger condition or the configuration information for performing handover to the target cell is based on a measurement report transmitted by the WTRU.

7. The WTRU of claim 1, configured to select a beam and a corresponding random access channel (RACH) resource above a threshold associated with the target cell with which to perform a RACH procedure.

8. The WTRU of claim 1, wherein the time period has elapsed when a current system frame number (SFN) associated with the target cell exceeds a preconfigured limit.

9. A method performed by a wireless transmit/receive unit (WTRU), the method comprising:
receiving, by the WTRU, from a network node associated with a serving cell, a conditional reconfiguration message that includes information indicating a trigger condition and configuration information for performing handover to a target cell based on a determination that the trigger condition is met, wherein the trigger condition is met when a number of beams associated with the target cell that have a measured signal quality exceeds a threshold number of beams; and
performing, by the WTRU, the handover to the target cell on a condition that the trigger condition is met before a time period has elapsed.

10. The method of claim 9, wherein a signal quality measurement report associated with the target cell is suppressed until the WTRU determines a signal quality measurement associated with the target cell exceeds a higher offset from a signal quality measurement associated with the serving cell.

11. The method of claim 9, wherein the configuration information is used to begin the handover to the target cell on a condition that the trigger condition is met after the time period has elapsed.

12. The method of claim 9, wherein a random access procedure utilizing a contention free random access channel (RACH) resource selected by the WTRU is performed on the target cell after the configuration information is applied.

13. The method of claim 9, wherein the information indicating the trigger condition includes another trigger condition based on trigger quantity value for performing handover to the target cell, wherein the handover procedure begins on a condition that a measured signal quality of a beam associated with the target cell is offset by at least a predetermined amount from the trigger quantity value.

14. The method of claim 9, wherein at least one of the information indicating the trigger condition or the configuration information for performing handover to the target cell is based on a measurement report transmitted by the WTRU.

15. The method of claim 9, further comprising selecting a beam and a corresponding random access channel (RACH) resource above a threshold associated with the target cell with which to perform a RACH procedure.

16. The method of claim 9, wherein the time period has elapsed when a current system frame number (SFN) associated with the target cell exceeds a preconfigured limit.

17. A wireless transmit/receive unit (WTRU) comprising:
a transceiver; and
a processor;
wherein the transceiver is configured to receive, from a network node associated with a serving cell, a conditional reconfiguration message that includes information indicating a trigger condition and configuration information for performing handover to a target cell based on a determination that the trigger condition is met, and wherein the configuration information for performing handover to the target cell indicates physical random access channel (PRACH) resources associated with a plurality of beams of the target cell;
wherein the processor and the transceiver are configured to determine whether the trigger condition is met based on measurements of the plurality of beams of the target cell; and
wherein the processor and the transceiver are configured to perform the handover to the target cell on a condition the trigger condition is met by:
selecting, based on the measurements of the plurality of beams of the target cell, one of the plurality of PRACH resources indicated by the configuration information; and
transmitting a random access preamble using the selected one of the plurality of PRACH resources, the random access preamble including a preamble sequence that is within a range of preamble sequences indicated by the configuration information.

18. The WTRU of claim 17, wherein the range of preamble sequences corresponds to a value between 0 and 63.

19. The WTRU of claim 17, wherein the range of preamble sequences corresponds to a value between 0 and 127.

* * * * *